United States Patent [19]

Orsburn et al.

[11] Patent Number: 4,642,682

[45] Date of Patent: Feb. 10, 1987

[54] PHASE RESPONSIVE COMPOSITE VIDEO SIGNAL CONTROL SYSTEM

[75] Inventors: Michael L. Orsburn, Copper City; Robert L. Hemsky, Boca Raton; James I. Bacon, Fort Lauderdale, all of Fla.

[73] Assignee: VTA Technologies, Inc., Hollywood, Fla.

[21] Appl. No.: 604,845

[22] Filed: Apr. 27, 1984

[51] Int. Cl.$^4$ ............................................. H04N 9/11
[52] U.S. Cl. ..................................... 358/80; 358/28; 358/54
[58] Field of Search ............... 358/28, 80, 76, 54, 358/27, 32, 22, 39, 81, 82

[56] References Cited

U.S. PATENT DOCUMENTS

| | | | |
|---|---|---|---|
| 3,558,806 | 1/1971 | Monahan et al. | 358/30 |
| 3,604,841 | 9/1971 | Ettlinger et al. | 358/32 |
| 3,610,815 | 10/1971 | Gould et al. | 358/21 R |
| 3,637,920 | 1/1972 | Becker et al. | 358/29 |
| 3,735,026 | 5/1973 | Smith et al. | 358/29 |
| 3,740,459 | 6/1973 | Okada | 358/28 |
| 3,824,336 | 7/1974 | Gould et al. | 358/80 |
| 3,893,166 | 7/1975 | Pugsley | 358/80 |
| 3,970,774 | 7/1976 | Bazin et al. | 358/160 |
| 4,069,432 | 1/1978 | Bazin | 358/27 |
| 4,096,523 | 6/1978 | Belmares-Sarabia et al. | 358/80 |
| 4,223,343 | 9/1980 | Belmares-Sarabia et al. | 358/54 |
| 4,272,780 | 6/1981 | Belmares-Sarabia et al. | 358/54 |
| 4,314,274 | 2/1982 | Atoji et al. | 358/80 |
| 4,410,908 | 10/1983 | Belmares-Sarabia et al. | 358/30 |
| 4,418,358 | 11/1983 | Poetsch et al. | 358/80 |
| 4,456,927 | 6/1984 | Marin | 358/27 X |
| 4,511,916 | 4/1985 | Fujimoto | 358/28 |
| 4,525,736 | 6/1985 | Korman | 358/28 |
| 4,544,944 | 10/1985 | Chin | 358/28 |

FOREIGN PATENT DOCUMENTS 1230813 6/1968 United Kingdom.

OTHER PUBLICATIONS

Kitson, et al., "Preprogrammed and Automatic Color Correction for Telecine", SMPTE Journal, Aug. 1974, pp. 633–639.

"Signal Processing in the Image Transform System" by Pete Comandini, SMPTE, vol. 86, Aug. 1977.

Harwood, "A Chrominance Demodulator IC with Dynamic Flesh Correction" IEEE Trans. Consum. Electron., Vol. CE-22, pp. 111–117 (Feb. 1976).

Rzeszewski "A Novel Automatic Hue Control System" IEEE Trans. Cons. Electron. Vol. CE-21, pp. 155–162 (May 1975).

Rathore et al. "An Accurate Digital Phase Measurement Scheme" Proceedings of the IEEE, vol. 72, No. 3, p. 397 (Mar. 1984).

Primary Examiner—John W. Shepperd
Attorney, Agent, or Firm—Jones & Askew

[57] ABSTRACT

A phase responsive video parameter control system operative for correcting hue, saturation, and luminance of a phase encoded component of a composite video signal. A digital phase detector detects the instantaneous hue of the video image, and provides a signal which selects which one of a plurality of color intervals or bands the detected instantaneous hue falls in. Prestored digital correction values associated with the selected color interval are retrieved from memory and converted into analog correction signals which modify the phase, amplitude, and DC level of the composite video signal. New digital correction values, which reflect operator control panel adjustments, may be loaded into memory during the vertical retrace interval, thereby allowing frame-by-frame color correction.

59 Claims, 15 Drawing Figures

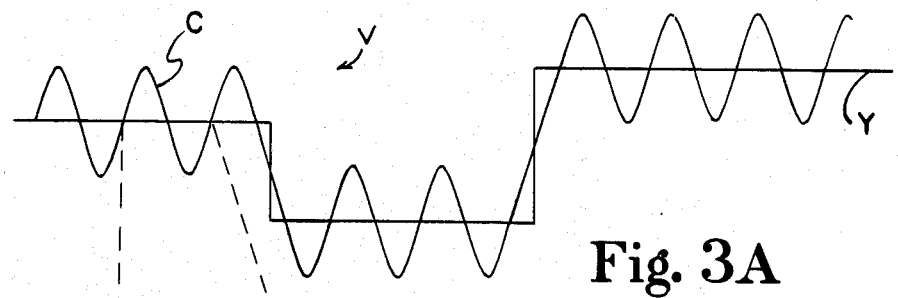
Fig. 3A
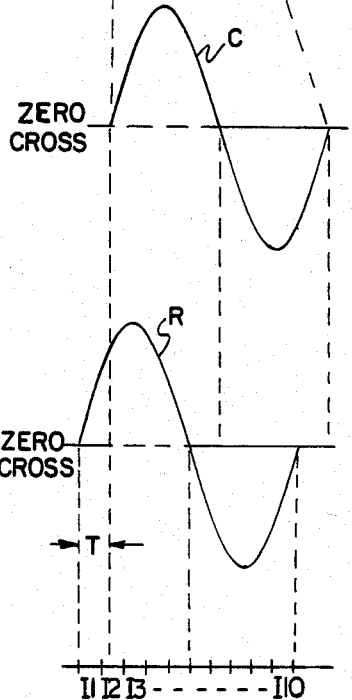
Fig. 3B
Fig. 3C
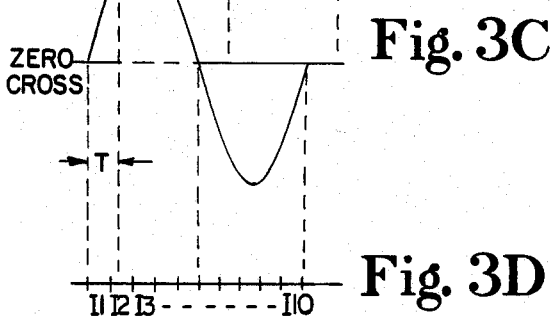
Fig. 3D
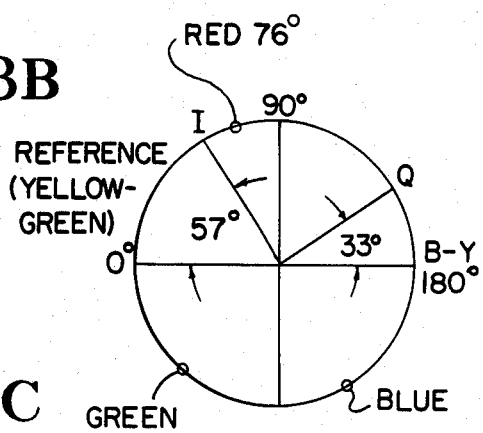
Fig. 4
Fig. 5
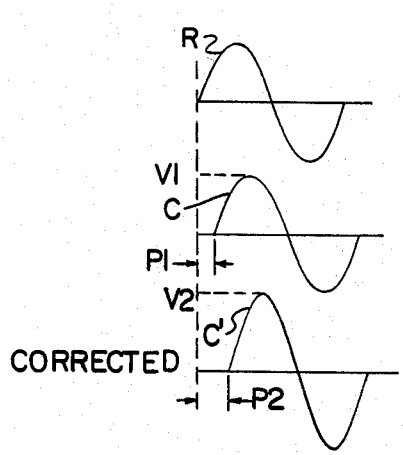
Fig. 6

$C2' = C2 + Q1A + Q2A$

PHASE RESPONSIVE COMPOSITE VIDEO SIGNAL CONTROL SYSTEM

TECHNICAL FIELD

The present invention relates generally to systems for the correction and control of video signals, and relates more particularly to a color video signal correction system which allows correction of the spectral distribution and luminance aspects of a phase-encoded video signal produced by a motion picture telecine, video tape reproducer or other video media.

BACKGROUND

Frequently in the television industry it is desirable to convert motion pictures or other image media such as video tape into video signals for recording or for transmission of the images to a viewing audience. Many technical problems are encountered in converting the motion picture images into video signals, including problems in the spectral response of the color dyes in the film, the characteristics of the telecine, and the fact that the characteristics of the photographic film are not matched to the electronic components used in the telecine or "film chain". Especially, problems are encountered in insuring that the spectral content of the resultant video signals are aesthetically acceptable and that the luminance or monochrome portion of the video signal provides an acceptable black and white image when reproduced on monochrome equipment.

One proposal for a color correction system for use in a film chain is shown in U.S. Pat. No. 4,096,523 to Belmares-Sarabia et al. In this system, color corrections are made in the video signals by adjusting the color hue and saturation, and by varying the proportions of the primary color video signals to form a composite luminance signal. The entire film is color-corrected by providing incremental adjustment signals which are added to or subtracted from standard values for each different scene in the film. The incremental adjustment values are stored in a computer memory associated with an event number, which is in turn associated with the count of the frame in the film at which the color correction was made.

After a series of color corrections have been made, a video tape recording of the color-corrected video signals is produced by re-running the motion picture film, video tape, or other video media through the system, while the color correction incremental adjustment signals are recalled from memory and added to the signals produced during the running of the film. The resultant color-corrected composite video signals are then recorded on the video tape recorder.

One problem with the system shown in U.S. Pat. No. 4,096,523 is that in creating the corrected video signals and the corrected composite luminance signal, control is provided only over the primary color video signals. Accordingly, if a spectral content correction or a luminance correction is effectuated by adjusting one of these primary video channels, any color mixtures in the video scene of which that primary color video signal is a primary color component together with another primary color component, will also be affected.

For example, with respect to luminance correction, signals designated R, B, and G from the video pick-up devices are processed and provided to a luminance control circuit. For each of the processed signals, designated PR, PB, and PG, there is provided a video amplifier which is controlled by a DC signal from a remote luminance control potentiometer. A conventional luminance signal, developed by a resistor network in accordance with the NTSC standard luminance mixture in the proportion of 30% of red, 11% of blue, and 59% of green, is then modified by controlling the PR, PB, and PG video amplifiers. Accordingly, it is apparent that in this device the luminance potentiometers separately vary the total red signal in the red channel in order to vary the amount of the red signal away from the standard 30%. Similarly, other luminance potentiometers provide for adjustment of the green and blue channels.

Inasmuch as the total red channel in the apparatus shown in U.S. Pat. No. 4,096,523 is luminance controlled, it follows that any portions of a video picture containing red information will be affected in luminance by adjustment of the luminance potentiometer for the red channel. For example, in a video scene having a red soft drink cup, an orange fruit, and a teak desk, each of these objects will vary in luminance or brightness by adjusting the luminance potentiometer for the red channel, since each of the objects of the picture contains some red information. Adjusting the red luminance potentiometer to increase the amount of red in the overall luminance signal will make brighter any object in the scene which contains any red. The red cup will be most affected, since it is primarily red, while the orange and the teak desk will also be affected, although somewhat lesser, since these objects have colors which include red in some amounts as one of the primary color components.

Accordingly, if the control in the red channel is adjusted, the luminance of any object in the scene, the color of which includes red as one of the primary color components, will be altered. Neutral tones such as whites and grays will also be affected. It is therefore apparent that the color correction device shown in U.S. Pat. No. 4,096,523 undesirably affects the spectral content of neutral tones and color mixtures containing one of the primary colors as one of the color components, when the luminance of that particular primary color is adjusted.

One proposal for providing a greater control over video signals is shown in U.S. Pat. Nos. 3,558,806 to Monahan et al. and 4,410,908 to Belmares-Sarabia et al. In particular, the latter patent employs the circuitry of the former patent in order to obtain six independently variable primary and complementary color derivative signals (yellow, green, red, blue, cyan, and magenta), which are combined with one another to obtain a luminance compensation signal. In essence, these patents disclose color separator circuitry which is responsive to the primary color video signals to provide a plurality of independent color derivative signals, each of which is separately variable so as to provide control over parameters such as luminance, hue, or saturation. Each of the independent color derivative signals is present only when the video image color information is predominantly the color of the particular independent color video channel.

Present day users of video color correction equipment desire even greater precision and control over video parameters such as hue, saturation, and luminance than can be provided with the apparatus disclosed in the Monahan and Belmares-Sarabia patents. For example, consider extending the concept shown in these patents to provide for independently variable color derivative signals other than the six primary and complementary colors. For each additional color derivative signal, there will necessarily be required a separate additional color separator circuit responsive to predetermined proportions of signal information present in the primary video channels, so that the presence of color information predominantly the color of the separated color channel can be detected for purposes of exercising control. Accordingly, it is apparent that if control is desired over eight, or ten, or twelve different colors, as opposed to the six primary and complementary colors, there will be needed eight, or ten, or twelve additional channels for developing the independent color derivative signals.

Accordingly, there is a need for color video control circuitry which is able to detect and control parameters of color video signals without requiring a separate channel of circuitry for each color over which control is desired to be exercised.

SUMMARY OF THE INVENTION

The present invention overcomes certain disadvantages of the approach shown in the Monahan and Belmares-Sarabia patents by removing detection of the hues to be controlled from the domain of the primary color video signals to the phase domain. In particular, the control and correction of electrical parameters in a color correction system of the present invention is controlled by providing phase responsive circuitry which detects hue information in a phase-encoded composite color video signal.

Briefly described, the present invention comprises in a video color correction system, an improved circuit for correction and control of a video parameter of an image represented by a phase-encoded video signal. The disclosed embodiment includes phase detecting means which is responsive to detect relative phase between a component of an uncorrected phase-encoded color video signal, and the 3.58 MHz reference subcarrier signal. As known to those skilled in the art, the detected relative phase is indicative of the instantaneous hue of the image represented by the video signal. Circuitry responsive to the detected relative phase generates a correction signal related to the detected relative phase, and additional circuitry responsive to the correction signal provides for correction of the phase-encoded video signal so as to provide a corrected composite video signal which has been adjusted to reflect the desires of the operator.

More particularly described, the present invention provides an apparatus and method for controlling a video parameter of a portion of a video image represented by a phase-encoded video signal, where the controlled portion of the video image is at least partially defined by a predetermined hue. The system comprises circuitry for detecting the predetermined hue by detecting relative phase between the phase-encoded video signal and the subcarrier reference signal, and is responsive to provide a control signal related to the predetermined hue. Circuitry responsive to the control signal recalls from memory a particular prestored correction signal which is related to a predetermined desired value of the video parameter for that particular predetermined hue. The recalled correction signal is then employed to correct the video parameter to the desired value.

Video parameters over which control can be exercised include the hue and saturation of the detected portion of the video image, which are controlled by shifting the phase of the phase-encoded signal for controlling hue and modifying the amplitude for controlling saturation, so as to actually modify the phase-encoded video signal. Also controllable is the luminance of the video image represented in the composite color video signal, by altering the luminance portion of the composite video signal.

Accordingly, it is an object of the present invention to provide an improved system for correction and control of color video signals.

It is another object of the present invention to provide an improved luminance and spectral content correction circuit.

It is another object of the present invention to provide a color video correction and control system which is able to detect hue information of a video image with greater resolution than shown in the prior art.

It is another object of the present invention to provide a system for detecting a greater number of discrete hues in a video image than shown in the prior art, and with finer definition in the hues, and to effectuate control or correction of a video parameter such as hue, saturation, or luminance related to a particular detected hue.

It is another object of the present invention to provide a color video correction and control system which operates in the phase domain instead of the domain of the primary color video signals, thereby providing detection of a variable over which control is to be exercised with a single channel of circuitry, as opposed to multiple parallel channels of circuits as required in the prior art.

It is another object of the present invention to provide a color video correction and control system which is able to detect when the color information of a video image falls within a selectable color window or interval, and effectuates correction of a video parameter to a desired level pertaining to the particular detected color interval.

It is another object of the present invention to provide a color video correction and control system which is operative to detect when the color information of a video image falls within a selectable color window or interval and effectuates correction of a video parameter by recalling prestored correction values related to the detected color interval and imposing correction upon a composite video signal.

It is another object of the present invention to provide an improved color video correction and control system for controlling the hue, saturation, and luminance of a portion of a video image preparatory to broadcasting or recording the video signal representing the image.

It is another object of the present invention to provide a color video correction and control system which operates on a composite video signal as opposed to the primary color video signals, and thus can be retrofit to a wide variety of video equipment without the need for separately isolating the primary color video signals.

These and other objects, features and advantages of the present invention may be more clearly understood and appreciated from a review of the following detailed description of the disclosed embodiment and by reference to the appended drawings and claims.

BRIEF DESCRIPTION OF THE DRAWINGS

FIGS. 3A-3D are diagrams illustrating a phase-encoded composite color video signal and the determination of relative phase with respect to the subcarrier reference signal.

FIG. 4 is a color circle illustrating phase angles of different hues and of the I and Q signals.

FIG. 5 illustrates the phase placement of color windows or intervals in the disclosed embodiment.

FIG. 6 shows sample waveforms illustrating the phase and amplitude correction of a typical phase-encoded composite video signal.

DETAILED DESCRIPTION OF THE PREFERRED EMBODIMENT

Figure 1A:
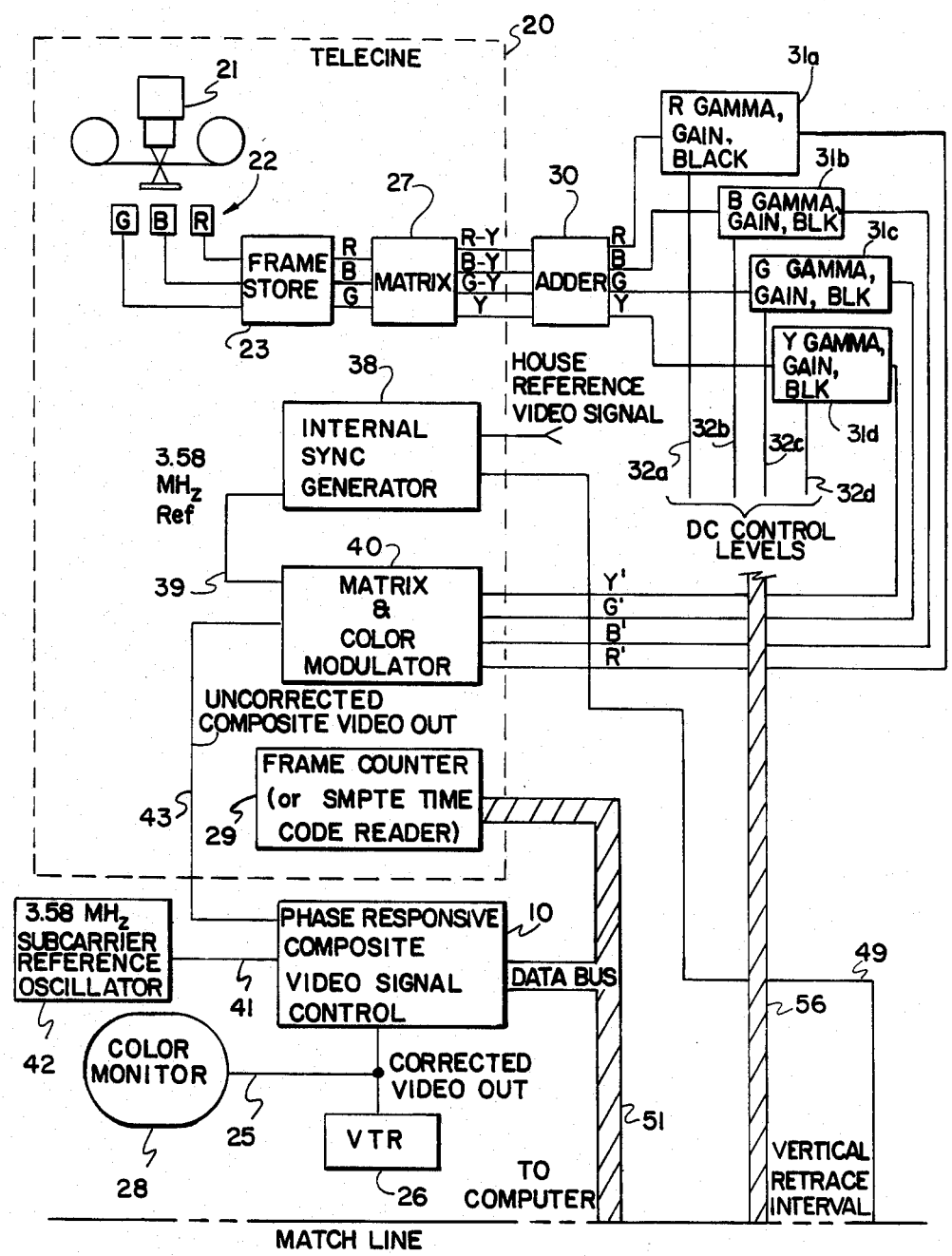
FIG. 1, consisting of FIGS. 1A and 1B, is a schematic block diagram of a color video correction and control system incorporating the phase responsive composite video signal correction circuit of the present invention.

Referring now to the drawings, in which like numerals indicate like elements throughout the several figures, FIG. 1 shows a block schematic diagram of a phase responsive composite video signal correction or control system 10 employed in connection with a conventional motion picture telecine 20. The disclosed embodiment employs a Bosch model FDL-60 telecine. The telecine 20 provides signals designed R-Y, B-Y, G-Y and Y, the primary color channels which have been matrixed with the luminance signal Y for subsequent use or processing.

As will be understood by those skilled in the art, the telecine 20 comprises a projector 21 which projects the photographic images recorded on film onto the video pick-up devices 22, such as orthicon tubes, charge-coupled devices, and the like, which produce the primary color video signals R, B and G. It will also be understood that a video tape recorder or other video image device can be employed in place of a motion picture telecine, and that control or color corrections can be made to the signals provided by these other devices. The primary color video signals R, B, and G are then provided to a frame storage circuit 23, which stores a video frame for viewing by the operator.

The outputs from frame storage circuit 23 are provided to a matrix 27, which combines the R, B and G signals in the known manner to produce a standard luminance signal Y, which is then subtracted from each of the primary color video signals to provide the outputs R-Y, B-Y and G-Y.

The signals R-Y, B-Y, G-Y and Y from telecine 20 are provided to an adder 30 which combines the signals in order to obtain a conventional red, blue, green and luminance channel, designed R, B, G, and Y. These signals are in turn provided to gamma, gain, and black control circuits 31a-31d, wherein the gamma, channel gain, and black levels for each primary channel are controlled. These parameters are controlled by DC control levels provided on lines 32a-32d from other circuitry. The outputs of gamma, gain, and black control circuits 31a-31d are the gamma-corrected primary color video signals R', B' and G', and the gamma-corrected luminance signal Y'.

The disclosed embodiment of the present invention is responsive to control or correct a phase encoded composite video signal. A phase reference is required to detect the phase of this signal. The telecine 20 in the disclosed system includes a conventional internal sync generator 38 which receives a house reference video signal and provides a 3.58 MHz reference signal on line 39 and a vertical retrace interval signal on line 49. The 3.58 MHz reference signal on line 49 is in phase with the 3.58 MHz subcarrier reference signal provided on line 41 by a house oscillator 42. The vertical retrace interval signal, which occurs once per video field, is used to signal the control computer to update stored correction values, described later. The 3.58 MHz subcarrier reference signal on line 41 is provided to the phase responsive circuit 10 for use as a phase reference.

The composite video signal is generated by a matrix and color modulator 40, which receives the gamma, gain, and black adjusted signals Y', R', G', and B' and converts these signals into the standard I and Q signals suitable for combination with the luminance signal Y' for color modulation to form the composite video signal. The color modulator 40 receives the 3.58 MHz reference signal on line 39, which is used to quadrature phase encode the I and Q signal in the known manner. The output of matrix and color modulator 40 is a phase-encoded baseband composite color video signal designated UNCORRECTED COMPOSITE VIDEO OUT provided on line 43 to the phase responsive control system 10.

The output of the control system 10 is a corrected composite video signal designated CORRECTED VIDEO OUT, provided on line 25 to a video tape recorder (VTR) 26, and is displayed on a color monitor 28. A frame counter 29 holds the frame count of the film being color corrected, and provides a twenty-four bit frame count to a control computer 50. For systems for color correction of video tape or other video media, a conventional SMPTE time code reader or similar frame identifying device would be employed for frame counter 29.

Figure 1B:
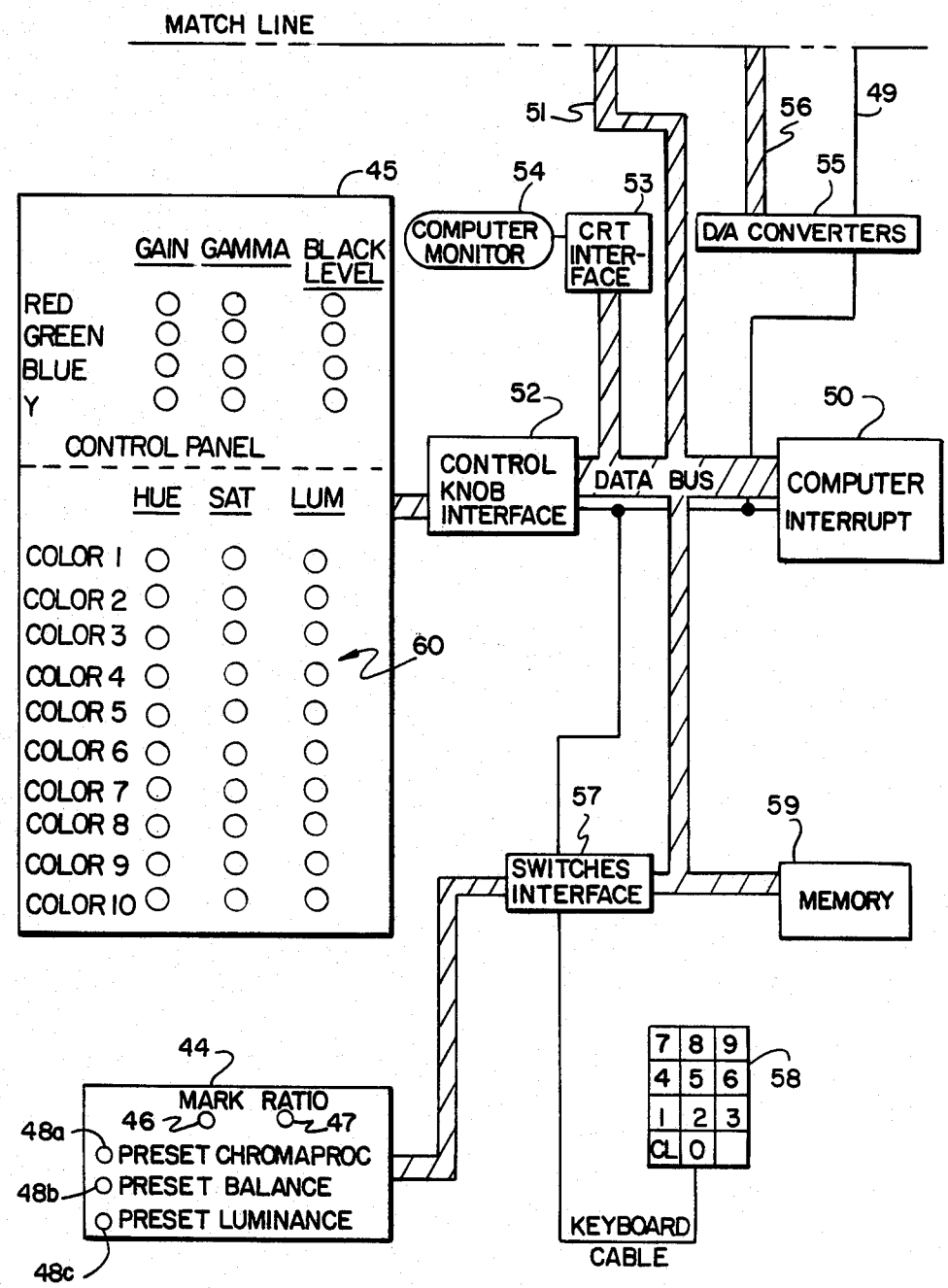

Control over parameters such as hue, saturation, and luminance of the video image represented by the uncorrected composite video signal on line 43, as well as over the gain, gamma, and black levels of the primary color channels, is made through a control panel 45. A plurality of operator control knobs are provided in the control panel 45 for actuation by an operator as a particular video image provided by the telecine is viewed on a color monitor 28, which is connected to receive the CORRECTED VIDEO OUT signal on line 25. As seen in FIG. 1B, there is provided a gain, a gamma, and a black level control knob for each of the primary color channels red, green, and blue, as well as for the luminance signal Y prior to correction.

The disclosed embodiment of the present invention is able to effectuate control over portions of the video image which are at least partially defined by a predetermined hue. The system described herein detects when the color information of the image falls within one of ten different color windows or intervals. All possible hues or color will fall within one of the ten intervals; there are accordingly provided ten sets of control knobs 60 to allow control over the hue, saturation, and luminance parameters of each of these ten color intervals.

It should however be understood that a single knob can be employed for control purposes by selecting which one of the ten color intervals and which video parameter the single knob will affect at any one given time. Those skilled in the art will therefore appreciate that control knobs whose function is software-defined can be employed to save panel space and reduce clutter. Accordingly, it will be appreciated that the description which follows, insofar as it describes a separate hue, saturation, and luminance control knob for each one of the disclosed number of ten color intervals, is completely arbitrary, and that there may be provided more or fewer sets of control knobs or more or fewer color intervals, as determined by factors such as the speed of the processing circuitry and the use of multiplexing or software function definition techniques.

There is also provided a switch panel 44, which includes various control switches such as "mark" switch 46 (for signalling the control computer to identify or "mark" the video scene being viewed with an identifying code such as frame number), "ratio" switch 47 (for allowing the selection of different scalings for the control knobs), and "memory preset" switches 48a, 48b, and 48c (for preselecting values of parameters for storage in computer memory).

A programmed microcomputer 50 is employed in the preferred embodiment to detect the movement of the control knobs and the actuation of the various switches, to convert the settings of the control knobs into the signals which are provided to the gamma, gain, and black control circuits 31a–31b and to the phase responsive control system 10. The computer 50 sends and receives signals over a data bus 51 to the various peripheral circuitry.

A control panel interface circuit 52 receives signals provided by the actuation of control knobs in the control panel 45 and converts these signals into computer-readable form for data bus 51. A CRT interface 53 is also connected to the data bus 51 and allows the computer 50 to display on a computer monitor 54 the amount of control indicated on the control panel. The operation of the control knobs is more particularly described in copending application Ser. No. 495,783 entitled "VIDEO SIGNAL CONTROL SYSTEM," the disclosure of which is incorporated by reference herein, and which is assigned to the assignee of the present invention.

A digital to analog converter circuit 55 is also connected to the data bus 51 and converts signals provided by microcomputer 50 into voltage levels which are provided on lines 56 and the DC control levels which are used to control the gain, gamma, and black-level corrections.

A switch interface 57 provides signals to the computer from the actuation of one of the switches in switch panel 44, or key pad 58 which is used to provide numerical input for scaling of the movement of the control knobs. Random-access memory 59 stores data related to the color correction values in locations associated with the frame count of the scene being corrected. Data from this memory is provided to the phase responsive circuit 10 at periodic intervals (as disclosed herein, during the vertical retrace interval) so that different color corrections can be made for different scenes.

PHASE RESPONSIVE CIRCUIT-OVERVIEW

Before turning to the specific operation of the phase responsive circuit 10, there will first be given an overview of the method of detection of hue information from the phase encoded composite video signal. The disclosed system is responsive to detect the phase relationship between an uncorrected baseband composite video signal introduced to the system on line 43 and a 3.58 MHz subcarrier reference signal provided on line 41. The outcome of the determination of the phase relationship between the uncorrected baseband composite video signal and the subcarrier provides an indication as to which of ten discrete color intervals (or "windows" or "fans") includes the hue of the video image represented by the baseband video signal, so as to allow prestored correction values associated with a particular color interval to be imposed upon the baseband composite video signal.

The system is responsive to provide a predetermined correction value depending upon which one of a plurality of discrete phase differences has been detected between the baseband signal and the subcarrier reference signal. As illustrated in FIG. 3, the composite video signal V comprises the phase encoded chrominance signal C, which is phase and amplitude modulated with the 3.58 MHz subcarrier together with the luminance signal Y. As known to those skilled in the art, the chrominance signal C provides hue (or color) information and saturation (or intensity) information, while the luminance signal Y provides black-white intensity.

FIG. 3b illustrates one complete cycle of the composite video signal V which has been expanded to illustrate the phase relationship between the chrominance signal C and the 3.58 MHz subcarrier reference signal R. As shown in FIG. 3c, there is a time interval T which bears a direct linear relationship to the phase difference between the reference signal R and the chrominance signal C. This time interval T can vary between 0 and 280 nS, corresponding to phase differences of 0° to 360°. For purposes of explaining the present invention, the detected phase difference can fall within one of ten windows or intervals, which are illustrated in FIG. 3d. It should be understood that more or fewer of these intervals may be provided, and that the selection of the number is arbitrary and depends in part upon the speed of the processing circuitry selected. The more intervals provided, the greater the resolution between hues over which control is possible.

For purposes of explanation, it should be understood that the detected phase difference between the subcarrier reference signal R and the chrominance signal C can fall within any one of the ten intervals I1–I10 in the disclosed embodiment. The present invention applies correction values to the composite video signal partially as a function of which of the ten intervals I1–I10 corresponds to the detected phase difference. For example, as shown in FIG. 3d, the illustrated phase difference represented by the time interval T in FIG. 3c falls within the interval I2, but does not quite cross the boundary into the interval I3. Accordingly, correction values associated with interval I2 are applied to the composite video signal.

It should now be understood that each of the intervals I1–I10 represents a color interval or "window" which is associated with a particular range of hues. As illustrated in FIG. 5, each of these intervals corresponds to a color interval or "fan" on a color television phase diagram. Continuing the example of FIG. 3, the phase difference T is about 70° and represents a hue having large amounts of red information. Accordingly, correction information corresponding to the color interval in which 70° falls is provided by the circuitry.

Those skilled in the art recall that the hues of the modulated C signal are determined by its varying phase angle with respect to the constant phase angle of the 3.58 MHz color reference signal. Those skilled in the art will also understand that the hue of the reference signal corresponds to a hue of yellow-green. When video information representing an image having this hue is provided, the phase angle of the chrominance signal C will be the same as the phase of the color reference signal. For different hues, the C signal has different phase angles. How much the phase angle differs from the reference signal phase determines how the hue differs from yellow-green.

It should also be recalled that hue phase angles are indicated in different ways. Standard measures for phase angles move counterclockwise as a positive direction from a zero axis (FIG. 4). For purposes of explanation of the present invention, hue phase angles will be counted clockwise from the reference signal R, that is, the 3.58 MHz color subcarrier reference signal. Accordingly, and as illustrated in FIG. 4, it will be understood that the I axis resides at 57° off the phase of the color reference signal, and the Q axis, in quadrature to the I axis, is 90° off phase of the I axis, or 33° off the B-Y axis.

As illustrated in FIG. 5, when the color phase circle is divided into ten color intervals, there will be ten fans or intervals I1-I10, each corresponding to a pie-shaped wedge of 36°. Thus, when the chrominance signal C is detected as falling within one of the color intervals, correction values corresponding to the particular detected color interval are applied to the composite video signal.

Continuing the example of FIG. 4, those skilled in the art will understand that the hue red generally corresponds to a phase angle of about 76°. This falls within the color interval I3. Thus, when video information which is red is detected by the system, correction values for the interval I3 will be recalled from memory and applied to the composite video signal. A hue which is more toward yellow-green, such as a generally orange hue having a phase angle of about 40°, falls within the color interval I2. Thus, if the hue of the video image is orange, correction parameters for the I2 color interval will be recalled and applied to the composite video signal.

PHASE RESPONSIVE CIRCUIT—GENERAL OPERATION

Figure 2:
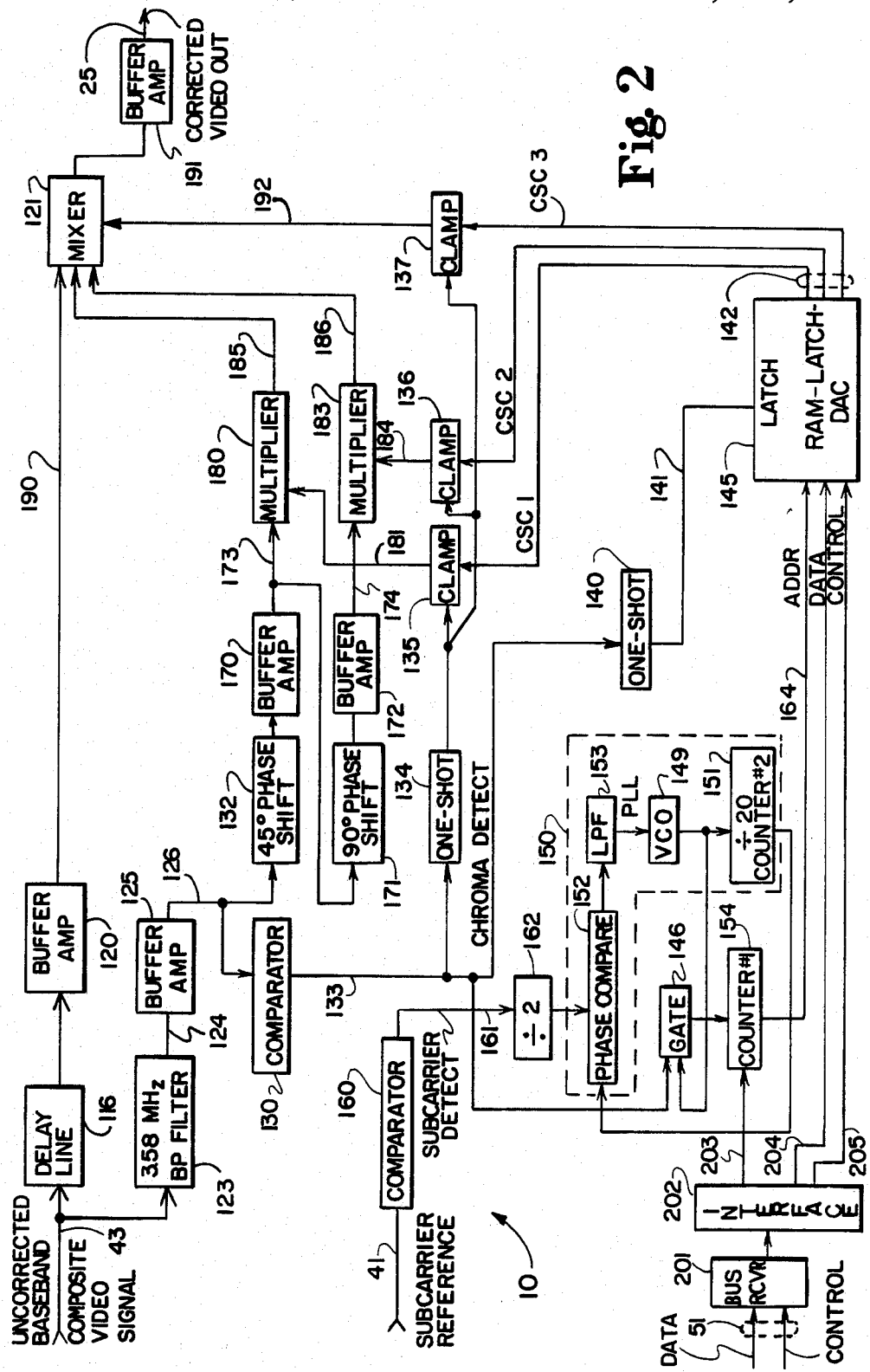
FIG. 2 is a schematic block diagram of the phase responsive composite video color correction circuit.

Turning now to FIG. 2, there will now be described the block diagram of the circuitry for effectuating the detection of the color intervals and for recalling correction values for the composite video signal corresponding to the detected color interval. In brief summary, the phase responsive circuit 10 divides each cycle of the 3.58 MHz reference subcarrier into N discrete intervals, determines which interval the phase of the composite video signal falls in, and applies correction values for the particular interval. In the disclosed embodiment, N equals ten.

The baseband composite video signal is applied on line 43 to the input of an analog delay line 116, which in the preferred embodiment imposes a delay of about 30 nanoseconds (nS). The delay line 116 compensates for the delay inherent in detecting the phase of the chrominance signal, for recalling digital correction values from memory, and for converting these correction values into an analog signal suitable for combining with the composite video signal. In the preferred embodiment, delay line 116 is a conventional video delay line manufactured by Matthey Printed Products Ltd., Stoke-on-Trent, England. The output of delay line 116 is provided to the input of a buffer amplifier 120, the output of which is connected to a mixer 121. Mixer 121 combines the uncorrected delayed composite video signal with other signals to form a phase- and amplitude-corrected composite video signal. The discussion below pertaining to FIG. 9 will describe the formation of the corrected signal.

The baseband composite video signal on line 43 is also provided to the input of a 3.58 MHz bandpass filter 123, which picks off the chrominance portion of the composite video signal and provides a filtered chrominance signal on line 124 to a buffer amplifier 125. The output of buffer amplifier 125, the CHROMINANCE signal, is provided on line 126 to the input of a level detect comparator 130 and also to the input of a phase shift network 132. Comparator 130 detects the zero crossings of the filtered chrominance signal and provides a square-wave output on line 133 having a 50 percent duty cycle, which has been designated as the CHROMA DETECT signal. The CHROMA DETECT signal provides a sharp rising edge having a rise time of about 1-2 nS indicative to the zero crossing of the chrominance signal.

The CHROMA DETECT signal is provided to various other circuitry in FIG. 2 for purposes which will be described below.

The CHROMA DETECT signal is provided to the input of a retriggerable monostable multivibrator or one-shot 134 which introduces a predetermined delay for purposes of activating clamping circuits 135, 136, and 137. The delay of one shot 134 is selected to be slightly greater than 140 nS, so that if no CHROMA DETECT signal occurs within the delayed period (such as during black and white video information), no color correction is allowed.

The CHROMA DETECT signal is also provided to a retriggerable monostable multivibrator or one-shot 140 which provides a latching signal on line 141. The latching signal is provided to the latches of a hybrid video random access memory, latched digital-to-analog converter circuit 145 (hereafter referred to as a "RAM-latch-DAC"). The latching signal latches digital correction values stored in random access memory of the RAM-latch-DAC for conversion to analog correction signals, which are provided on lines 142. The video RAM-latch-DAC will be discussed in greater detail in connection with the detailed circuitry below.

The CHROMA DETECT signal is also provided to the input of a gate circuit 146. The other input to gate circuit is the output of a voltage controlled oscillator (VCO) 149, which comprises a part of a phase-locked loop (PLL) circuit 150. PLL 150 is employed in the preferred embodiment to lock onto the 3.58 MHz subcarrier while simultaneously providing a multiply-by-twenty function. The PLL 150, in addition to VCO 149, includes a divide-by-twenty counter 151, a phase comparator 152, a low pass filter 153, and a latched counter 154. The latched counter "freezes" the instantaneous detected phase and therefore the instantaneous hue, and will hereinafter be referred to as counter #1 (154).

One purpose of PLL 150 is to force counter #1 (154) to the zero count at the beginning of each subcarrier cycle, and to allow the counter to divide a full subcarrier cycle into ten equal portions, each representing 36°.

The subcarrier reference signal provided on line 41 is provided to a comparator circuit 160 which provides a function similar to comparator circuit 130. Accordingly, the comparator circuit 160 provides a 50 percent duty cycle square-wave output on line 161 denominated SUBCARRIER DETECT, having a sharply rising positive edge corresponding to the zero crossing of the subcarrier. The phase difference between the CHROMA DETECT signal and the SUBCARRIER DETECT signal is related to the instantaneous hue of the video image represented by the composite video signal.

The SUBCARRIER DETECT signal on line 161 is connected to a divide-by-two circuit 162, the output of which is provided to an input of phase comparator 152 in the PLL 150. Accordingly, phase comparator 152 compares the phase difference between the subcarrier and the output of VCO 149 (which has been divided by twenty by counter 151), so that the PLL 150 can lock onto the subcarrier.

Another purpose of phase-lock loop 150 is to allow counter #1 (154) to count to ten during each full cycle of the subcarrier during subcarrier lock. Thus, each count of counter #1 corresponds to one tenth of a full subcarrier cycle. Counter #1 is forced to the zero count, as will be described in further detail below, at the beginning of each subcarrier cycle, and then begins to count to ten. Accordingly, each state of counter #1 corresponds to one tenth of the subcarrier cycle, thereby providing the ten color intervals, each color interval corresponding to a 36° interval.

The outputs of counter #1 (154), which are latched by gate circuit 146, are provided on lines 164 as the addresses for the RAMs in the RAM-latch-DAC 145. It will thus be appreciated that gate circuit 146 and PLL 150 comprise means for detecting the relative phase between the phase-encoded composite video signal as manifested by CHROMA DETECT, and the subcarrier reference signal as manifested by SUBCARRIER DETECT.

It should now be understood that the state of counter #1 (154), as represented by the lines 164, selects data stored in RAM to be latched by the latch signal on line 141 to appear as the correction signals on lines 142. It should also be understood that counter #1 is counting through its ten counts on each subcarrier cycle. When the rising edge of the CHROMA DETECT signal appears on line 133, thereby triggering one-shot 140 and producing the latching signal on line 141, the data stored in RAM corresponding to the phase difference between the subcarrier reference signal and the chrominance signal is latched into the DAC of RAM-latch-DAC 145, to cause the production of a correction signal corresponding to the detected instantaneous hue as represented by the phase difference.

Returning to buffer amplifier 125 in FIG. 2, the CHROMINANCE signal provided on line 126 is provided to phase shift network 132. The phase shift circuit 132 creates a 45° phase shifted chrominance signal, which is then provided to a buffer amplifier 170. The output of buffer amplifier 170 is provided to the input of a second phase shift circuit 171, which creates a 90° phase shifted chrominance signal. The output of the second phase shift circuit 171 is provided to the input of a buffer amplifier 172. It should thus be understood that the output of buffer amplifier 172 represents the results of a 45° phase shift introduced by phase shift circuit 132, and a 90° phase shift introduced by phase shift circuit 171, thereby providing a signal on line 174 which is phase shifted 135° from the signal on line 126. It will also be appreciated that the signals on lines 173 and 174, being 90° apart in phase, are in quadrature.

The signal from buffer amplifier 170 on line 173 is provided to a first multiplier circuit 180, where it is combined with a control signal received on line 181 through the clamping circuit 135. In a similar fashion, the 135° phase shifted signal from buffer amplifier 172 on line 174 is provided to an input of a second multiplier circuit 183, where it is modified by a control signal provided on line 184 through clamping circuit 136. It should thus be understood that multipliers 180, 183 modify the 45° phase shifted signal and the 135° phase shifted signal by predetermined amounts determined by the control signals on lines 181, 184 to obtain desired multiplied quadrature resultants of the CHROMINANCE SIGNAL, which manifest hue and saturation correction.

The outputs of multiplier circuits 180, 183 are provided on lines 185, 186 to mixer circuit 121, which combines the signals with the delayed composite video signal on line 190 to produce a phase shifted chrominance signal which is the additive result of the multiplied quadrature resultants and the delayed composite signal. It should be understood that since each of the multipliers 180, 183 operates in two quadrants, a resultant signal from the mixer can represent a 0° to 360° phase shifted CHROMINANCE signal.

A luminance correction signal provided on line 192 through the clamping circuit 137 is also added to the signals by mixer 121. The effect produced by the luminance correction signal is to change the DC level about which the chrominance signal oscillates, and thereby allows correction or control of the luminance of the detected instantaneous hue. The output of mixer 121 is provided to a video amplifier 191, whose output on line 25 is the corrected composite video signal.

Figure 9:
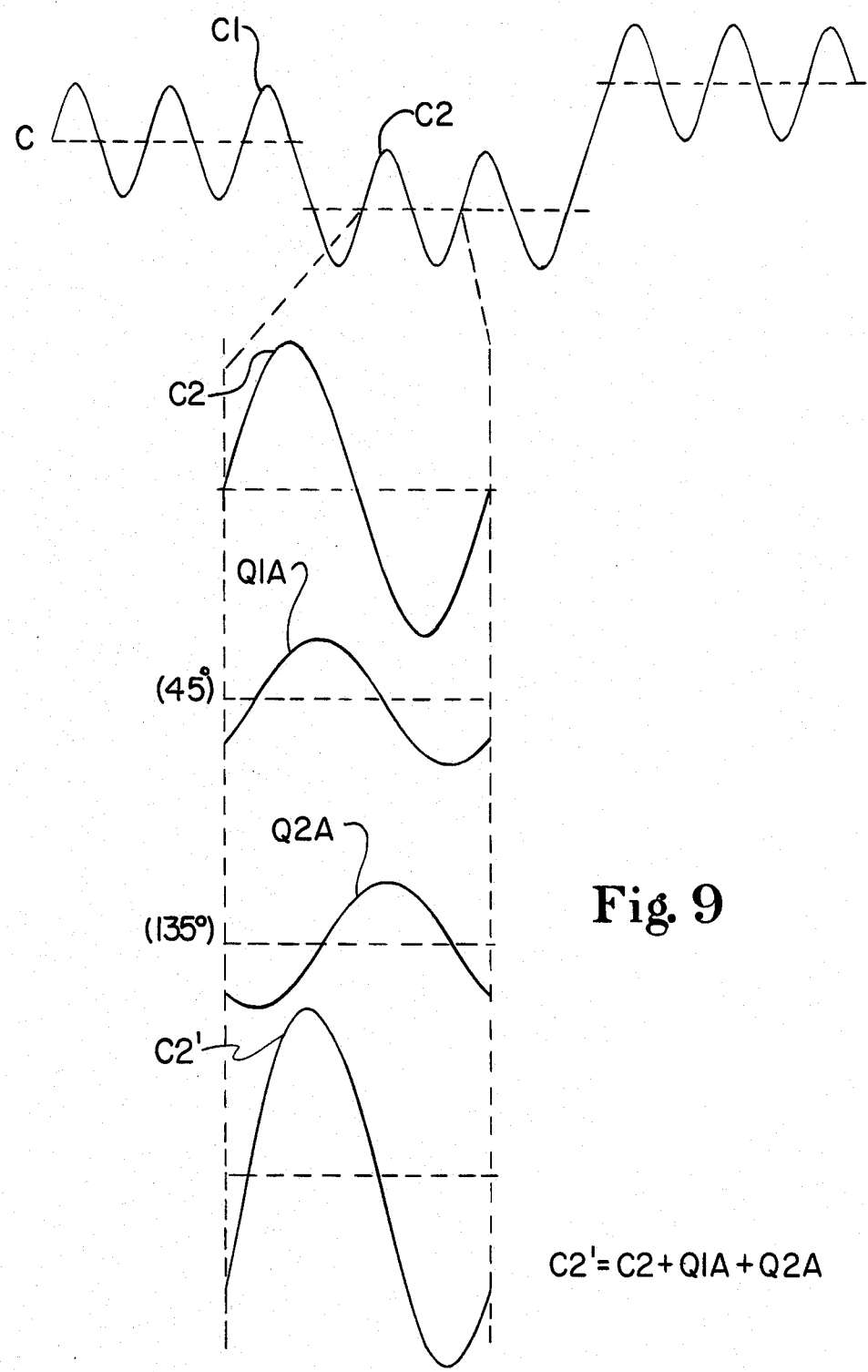
FIG. 9 is a diagram illustrating the quadrature correction of the phase-encoded composite video signal.

An example of the additive combination of signals is illustrated in FIG. 9. The chrominance signal (delayed) to be corrected is C, while the particular predetermined hue upon which control is based is represented by the signal portion C2, which occurs after a hue change from the hue represented by the signal portion C1. The multiplied quadrature resultant signals are Q1A (a delayed 45° phase shifted quadrature component from multiplier 180), and Q2A (a delayed 135° phase shifted quadrature component from multiplier 183). The signals are additively combined by mixer 121 to produce the CORRECTED VIDEO OUT signal designated C2' in FIG. 9, where:

$$C2' = C2 + Q1A + Q2A$$

It will be noticed in FIG. 9 that the corrected signal C2' manifests a phase shift and an amplitude change from the input signal C2 as a result of the additive mix. Accordingly, it will be appreciated that the signal C2' has been corrected in hue and in saturation.

The determination of the amounts of multiplication to apply to the 45° and 135° phase shifted quadrature component signals is made by computer 50 based on the amount of rotation applied by the operator to the control knobs. The amount of rotation is translated into digital signals which are temporarily stored in memory 59 until a vertical retrace interval, when the digital signals are downloaded into the phase responsive circuit 10. Because of the high speed of circuit operation and response, the effects of movement of any of the control knobs 60 are virtually instantaneously manifested on the color monitor, so that the operator may make as many or as precise adjustments as required.

The translation of control knob movement into the control signals CSC1 and CSC2 for multipliers 180 and 183 is made according to the following equation:

$$CSC1 = A_R \cos(\theta_R - \theta_N) - \cos\theta_N$$

$$CSC2 = A_R \sin(\theta_R - \theta_N) + \sin\theta_N$$

where
$A_R$ = the desired amplitude of the resultant corrected composite video signal,
$\theta_R$ = the desired phase of the resultant corrected composite video signal, and
$\theta_N$ = $-45°$.

Computer 50 is used to solve these two simultaneous equations.

It will therefore be appreciated that these transformations may easily be accomplished by the software of computer 50 without undue experimentation, and the results of the transformation provided over the data bus 51 to the phase responsive circuit 10. Thus, separate and convenient control may be exercised over each of the color intervals.

It will accordingly be appreciated that the phase responsive circuit provides means for generating analog control or correction signals which are related to the detected phase of the phase-encoded chrominance signal (and therefore the instantaneous hue) and which are provided to the multipliers 180 and 183. It will also be appreciated that the multipliers and mixer 121 comprise means responsive to these correction or control signals for correcting or controlling the phase-encoded composite video signal in hue or saturation by altering the phase and/or amplitude.

FIG. 2 also discloses circuitry for placing digital information corresponding to the desired correction for chrominance and luminance as a result of the control knob movement transformations from the RAM of RAM-latch-DAC circuit 145. The amount and type of correction is provided from the central control computer 50 of FIG. 1 and disclosed in co-pending application Ser. No. 495,783. The operator of the correction system indicates the desired amount of control by actuating control knobs on the control panel. In the disclosed embodiment, a separate control knob is provided for each parameter for each one of the plurality of color intervals, so that separate control may be effectuated over the video signal when there is color information corresponding to a particular one of the color intervals.

For example, and referring to the example of FIG. 5, when control is desired over a color such as orange which falls within the color interval I2, actuation of the control knob associated with the color interval I2 will cause a change in the composite video signal when the chrominance signal indicates the presence of a color mix representing orange. Thus, although orange normally is represented by about 40° phase, control may be effectuated to shift the phase of the signal higher or lower, for example to 45° (closer to red) or as another example to 32°, (closer to yellow-green).

Alternatively, a single set of software configurable control knobs can be employed to save peripheral circuitry and reduce control panel clutter, by reassigning in software which one of the color intervals is controlled by a single set of hue, saturation, and luminance knobs at a selected time.

Data and control signals provided by the operator reach the central control computer on the computer data bus 51. These control signals are processed by the computer to determine which color interval has been selected for control, the control knob movement transformation calculation performed, and the desired data for the multipliers 180 and 183 (in digital form) provided to bus receivers 201, which provide the information received from the central control computer 50 to an interface circuit 202. Interface circuit 202 produces appropriate control signals on line 203 for forcing counter #1 (154) to address the RAM of RAM-latch-DAC 145 when the loading of control information is desired. Control information in the disclosed embodiment is loaded during the vertical retrace interval. Data is provided to the RAM on data lines 204. Additional control lines 205 are provided for controlling the writing of data from the central control computer into the RAM.

It should thus be appreciated that once per video field, at the beginning of the vertical retrace interval, the computer 50 receives an interrupt on line 49 from the sync generator 38, and thereafter causes the interface circuit 202 to take control of counter #1 (154) for purposes of addressing the RAM to load control and correction information into the RAM over the data bus 51.

ANALOG CIRCUITRY DETAIL—PHASE DETECTION

Figure 7A:
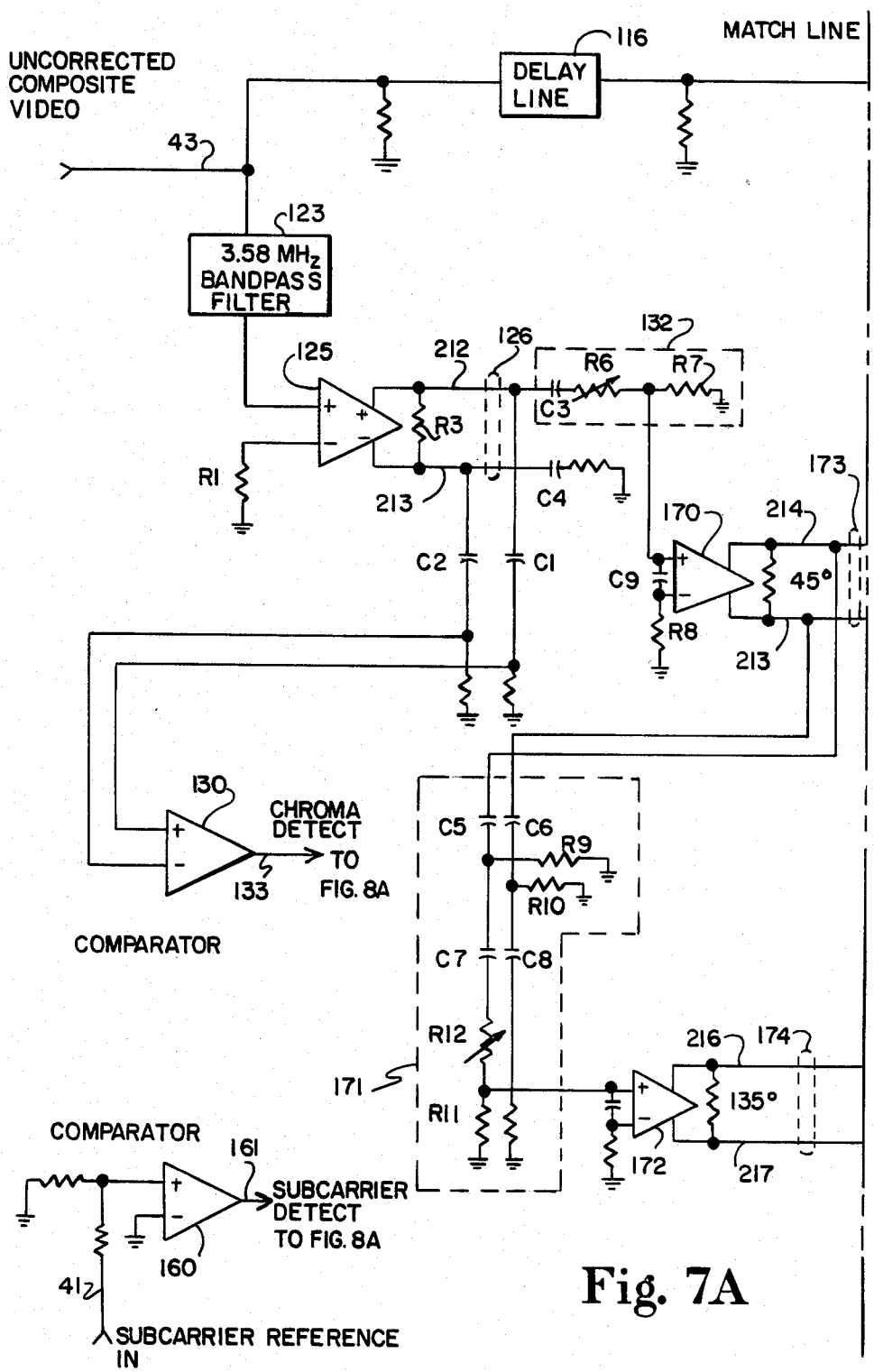
FIG. 7, consisting of FIGS. 7A and 7B, are detailed schematic diagrams of the analog section of the preferred embodiment of the present invention.
Figure 7B:
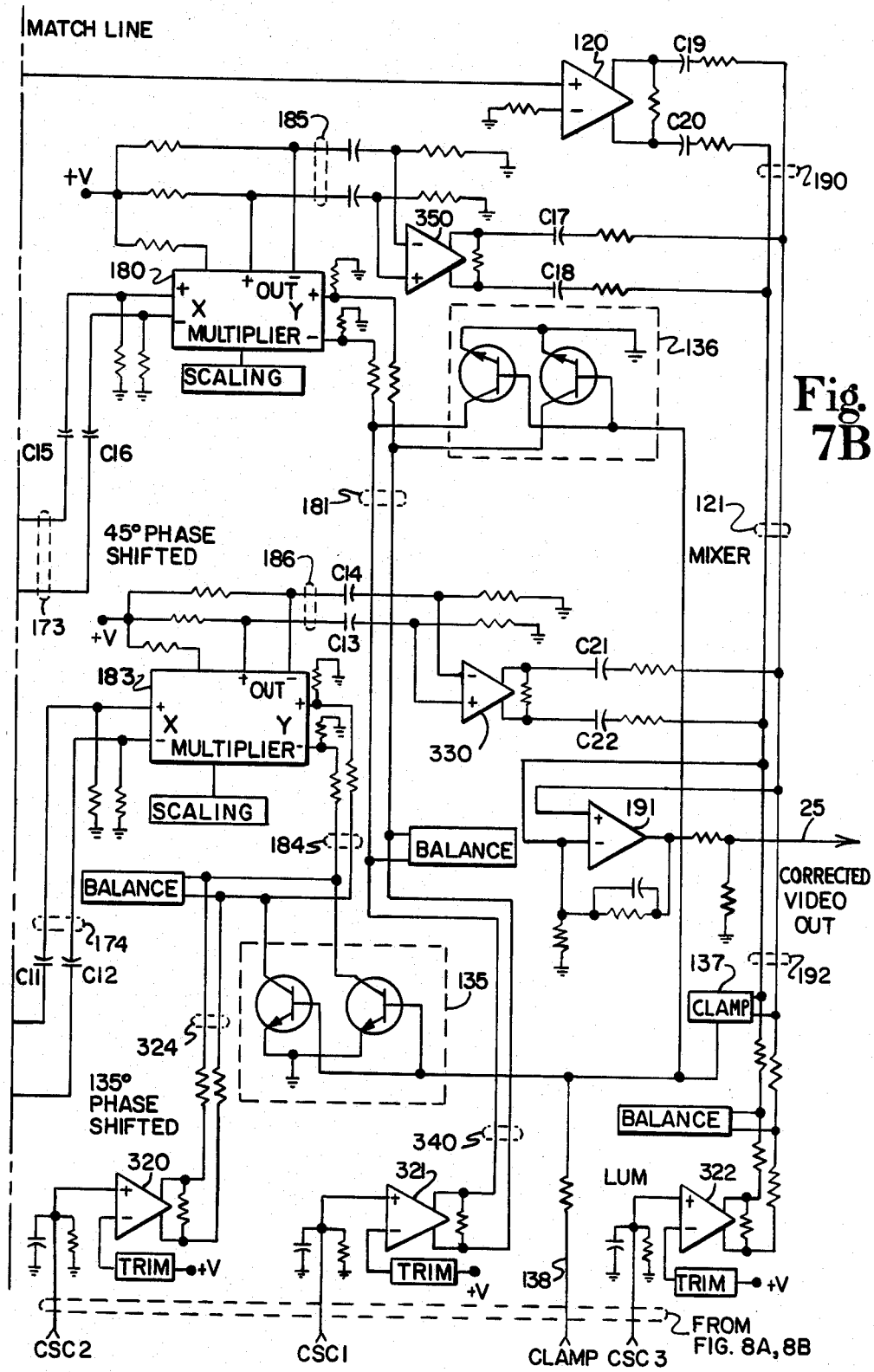

Turning now to FIG. 7, comprising FIGS. 7A and 7B, there will now be described in detail the analog circuitry employed in the disclosed embodiment. In FIG. 7A, the baseband composite video signal on line 43 is first provided to 3.58 MHz bandpass filter 123. In the preferred embodiment the bandpass filter 123 comprises a conventional passive notch filter which passes frequency components at the subcarrier frequency of 3.58 MHz. It will be understood that an active bandpass filter could be employed for bandpass filter 123, to introduce a predetermined phase shift, so as to combine the function of filtering and phase shifting. In the preferred embodiment, bandpass filter 123 includes adjustments for amplitude, phase, and attenuation of the signal passing therethrough, so as to obtain a filtered output signal passing frequencies at 3.58 MHz but attenuating the upper and lower side bands around 3.58 MHz.

The filtered chrominance signal on line 124 is provided to one input of buffer amplifier 125, which in the preferred embodiment is a type TL592 differential video amplifier manufactured by Texas Instruments, Inc., Dallas, Tex. The second differential input of buffer amplifier 125 is connected through a resistor R1 to reference ground. Buffer amp 125 is provided to compensate for attenuation in the signal introduced by the bandpass filter and to bring the signal to intermediate amplitudes. The differential outputs of amplifier 125 are provided on lines 212, 213, connected by load resistor R3.

Those skilled in the art will understand that the use of differential outputs such as on lines 212, 213 advantageously provides wide bandwidth, low phase distortion, and improved gain stability. The TL592 amplifier used in the disclosed embodiment for buffer amplifiers is frequently used in a differential output mode. Accordingly, those skilled in the art will understand that wherever the differential output mode is shown in the drawings, load resistors such as R3 and impedance-matching resistors such as R6, R7 are used to condition the output signals for subsequent stages, and will not be discussed further. Also, it should be understood that each TL592 buffer amplifier includes a differential offset adjustment network and a gain adjustment network, which will not be discussed further herein.

Differential output lines 212, 213 comprise the line 126 as shown in FIG. 2 as the CHROMINANCE signal. Lines 212, 213 are provided through isolation and coupling capacitors C1, C2, respectively, to the differential inputs of level detecting comparator circuit 130. In the preferred embodiment, comparator 130 is a type LM360 high speed differential comparator manufactured by National Semiconductor Corporation, Santa Clara, Calif. The output of comparator circuit 130 is provided on line 133 and comprises the CHROMA DETECT signal. The differential inputs to comparator 130 insure that a positive-going output is produced when the differential inputs are zero, which occurs at the zero crossing of the chrominance signal, or when the chrominance signal passes through zero volts. Accordingly, it will be appreciated that comparator 130 is constructed to provide a 50 percent duty cycle signal having a sharply rising edge aligned with the zero crossing of the chrominance signal.

The chrominance signal is now provided to phase shifting circuitry for purposes of creating two quadrature shifted chrominance signals which are modified by control signals for imposing desired correction. Still referring to FIG. 7A, the signal on line 212 from amplifier 125 is provided through a phase-shift network 132 to buffer amplifier 170. Buffer amplifier 170 in the preferred embodiment is a type TL592 differential video amplifier. Phase shift network 132 comprises capacitor C3, trim pot R6, and resistor R7, which create a 45° phase shift network at the inputs of amplifier 170 at the subcarrier frequency. Trim pot R6 is used to adjust the phase adjustment to 45°.

Amplifier 170 is operated in the single-ended input mode, with resistor R8 providing impedance matching and capacitor C9 compensating for stray capacitance which might create high frequency attenuation.

The output of buffer amplifier 170 is provided differentially on lines 214, 215, which comprise the line 173 in FIG. 2.

Subsequent to buffer amplifier 170, there is introduced a 90° phase shift by a phase shift network 171. Phase shift network 171 comprises capacitors C5, C6, resistors R9, R10, R11, capacitors C7, C8, and potentiometer R12.

After a 90° phase shift has been introduced by the foregoing components, the signal is introduced to buffer amplifier 172. In the preferred embodiment, buffer amplifier 172 is a type TL592 differential video amplifier configured to provide a differential output in a manner similar to amplifier 170. Those skilled in the art will appreciate that potentiometer R12 can be adjusted to insure that a phase shift of 90° (within acceptable tolerance) is introduced into the signal provided on line 173.

The differential output of buffer amplifier 172 is provided on lines 216, 217, which comprise the line 174 shown in FIG. 2. The resultant signal on line 174 possesses a net 135° degree phase shift from the chrominance signal appearing on line 126. Similarly, the differential signal appearing on line 173 from the output of buffer amplifier 170 possesses a net 45° phase shift from the chrominance signal appearing on line 126. It will therefore be understood that a quadrature relationship exists between the signals on lines 173 and 174, there being a 90° phase difference between these signals. These quadrature signals, designated "delayed quadrature chrominance signals", are provided to circuitry in FIG. 7B, discussed in greater detail below.

Also shown in FIG. 7A is a second voltage level comparator 160 which receives the 3.58 MHz subcarrier reference signal on line 41. In the preferred embodiment, the comparator 160 is a type LM360 high speed differential comparator. The negative differential input of comparator 160 is referenced to ground (zero volts), so that the zero crossing of the subcarrier reference signal can be detected. The output of comparator 160 is the signal SUBCARRIER DETECT provided on line 161.

The signal on line 161 is a 50 percent duty cycle signal having a sharply rising edge corresponding to the zero crossing of the subcarrier signal. The phase difference between the SUBCARRIER DETECT and the CHROMA DETECT signals corresponds to the time period T, which represents the phase angle of the original chrominance signal with respect to the subcarrier. The time period T is used to select a particular one of the ten color intervals, thereby uniquely selecting correction values for the particular color interval. This phase difference, or time period is utilized in the digital circuitry shown in FIG. 8 and described next.

DIGITAL CIRCUITRY DETAIL

Figure 8A:
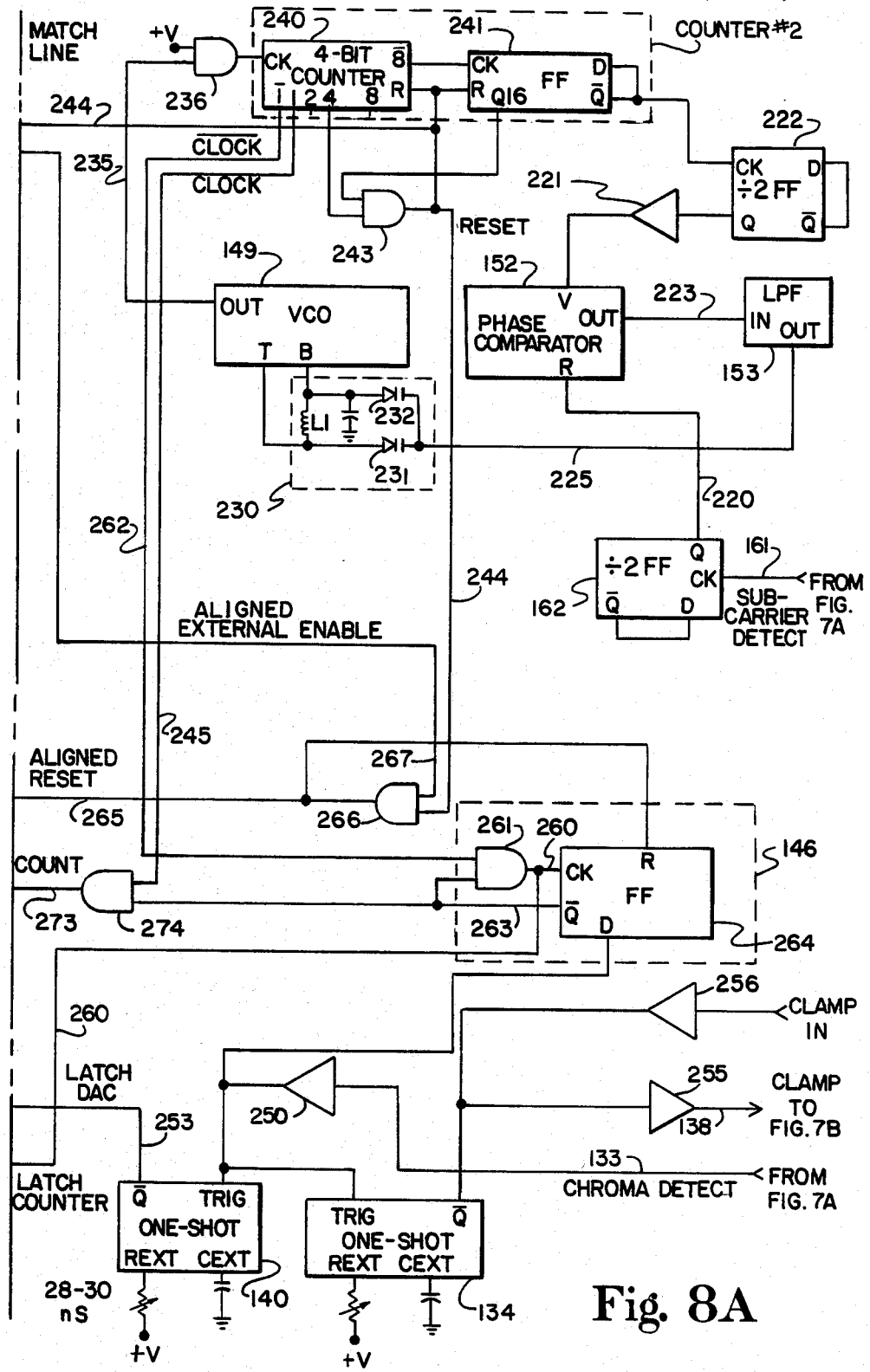
FIG. 8, consisting of FIGS. 8A and 8B, are detailed schematic diagrams of the digital section of the preferred embodiment of the present invention.
Figure 8B:
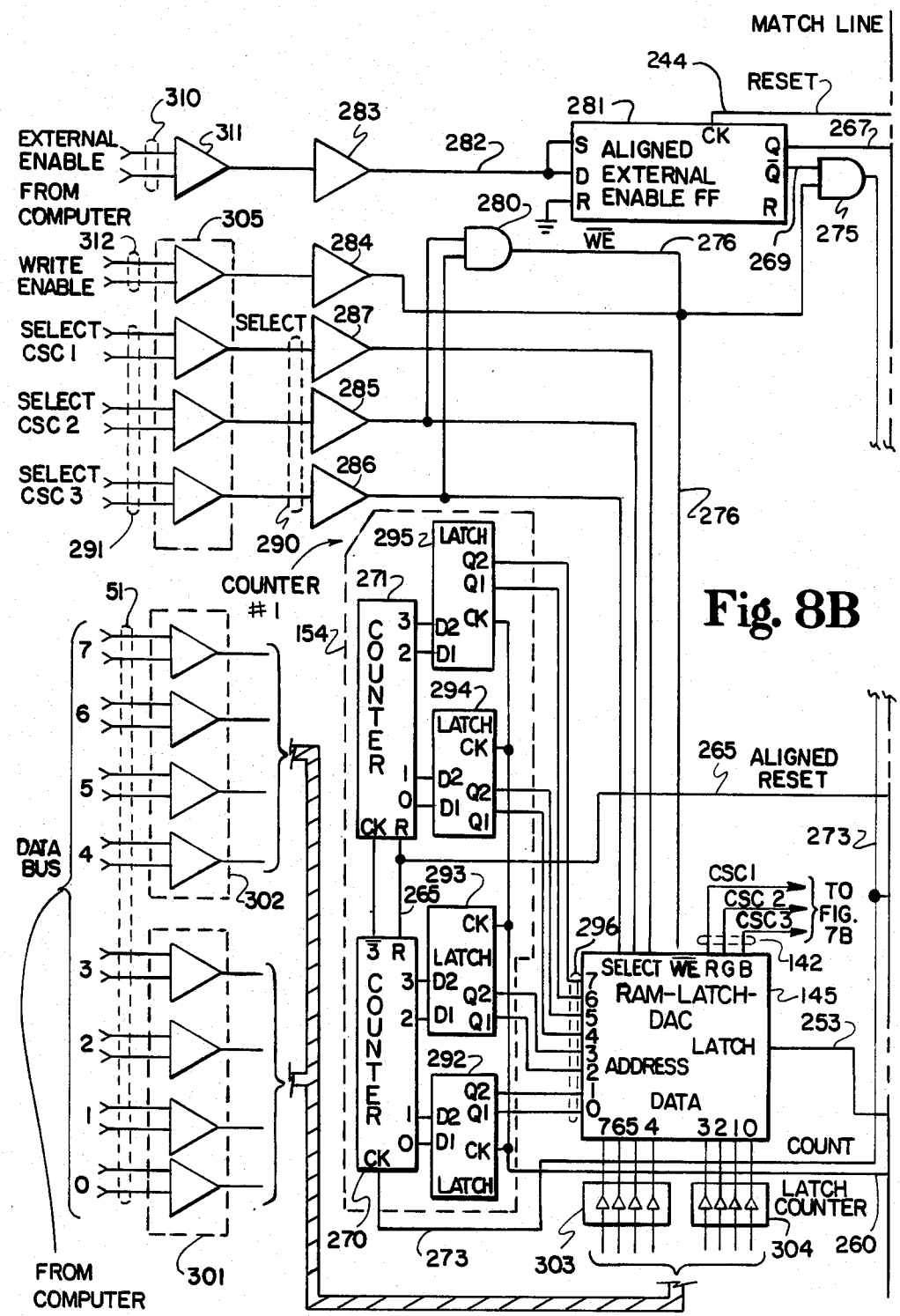

Turning now to FIG. 8, consisting of FIGS. 8A and 8B, there will now be discussed the digital circuitry which is responsive to lock to the 3.58 MHz subcarrier, to determine the phase difference between the subcarrier and the chrominance signal, and to provide analog correction signals from stored digital information corresponding to the desired correction for a particular determined phase difference. First will be described the circuitry comprising the phase-locked loop 150 shown in FIG. 2, which is responsive to lock to the subcarrier reference signal and provide a frequency multiplication of twenty.

The signal SUBCARRIER DETECT provided on line 161 is provided to the input of a divide-by-two circuit 162. In the preferred embodiment, the divide-by-two circuit 162 is a type 74S74 high-speed D-flipflop which has the negated Q output connected to the D input. The Q output, which represents the subcarrier frequency divided by two, is provided on line 220 to a phase comparator 152. In the preferred embodiment, phase comparator 152 is a type MC4344 high speed phase-frequency detector manufactured by Motorola Inc., Phoenix, Ariz.

The divided-by-two subcarrier is provided to the R input of the phase comparator 152, while the V input is connected to the output of a ECL-to-TTL translator 221 which provides a TTL level signal representing the divided-by-forty output of the voltage controlled oscillator (VCO) 149 shown in FIG. 2. The translator 221 is connected to the output of a divide-by-two circuit 222 (configured like circuit 162), which provides the final divided-by-forty VCO output. The phase comparator 152 is configured to generate an error voltage that is proportional to the phase difference between the V and the R input terminals. The output of phase comparator 152 is provided on line 223 through a low pass filter 153. In the preferred embodiment, low pass filter 153 comprises a conventional passive low pass filter which includes a voltage adjustment for centering the oscillation of the VCO 149.

The output of low pass filter 153 is provided on line 225 to a tank circuit 230 which is employed at tank input T of VCO 149. The circuit 230 comprises a pair of varactor diodes 231, 232 connected in parallel to line 225 and including a coil L1, which form a tank circuit commonly employed in digital frequency tuning or synthesis. The voltage provided from the low pass filter adjusts the capacitance of the tank circuit and thus the frequency of the VCO. The frequency of the VCO is preferably set to vary about a nominal center frequency of about 71.6 MHz, which is twenty times the subcarrier frequency of 3.58 MHz. In the preferred embodiment, VCO 149 is a type MC1648 voltage-controlled oscillator manufactured by Motorola, Inc.

The output of VCO 149 is provided on line 235 to the input of a gate 236 to square up the VCO output. Preferably, gate 236 is a type MC10104 ECL or equivalent high-speed circuit. The output of gate 236 is connected to the clock input of counter #2 (151) for purposes of dividing each cycle of the detected subcarrier into a predetermined number of intervals. In the preferred embodiment, and as described earlier, there are provided ten discrete intervals for each full cycle of the subcarrier, although it will be appreciated after the discussion which follows that the full subcarrier cycle can be divided into any number of intervals limited only by the speed of the circuitry chosen to implement the embodiment.

In the disclosed embodiment, counter #2 (151) comprises a four-bit high-speed type MC1654 ECL counter, the most significant count bit of which is cascaded to the clock input CK of the type MC10H131 high-speed ECL flipflop 241. When counter 151 reaches a count of twenty the counter is reset to zero. The twenty count is detected by connecting the Q output of flipflop 241 to one input of an AND gate 243, with the other input to the AND gate 243 being connected to the divide-by-four terminal of the counter 240. Thus, when a count of twenty is reached, a positive going signal will appear on line 244. The signal on line 244 is designated as a RESET signal which occurs once per subcarrier cycle and provides various synchronization functions described further below. The RESET signal on line 244 is provided to the reset input R of counter 240 and flipflop 241 to force counter #2 (151) back to the zero count upon attaining a count of twenty.

It should now be appreciated that the phase lock loop circuit 150 shown in FIG. 2 synchronizes and locks to the frequency of the subcarrier, and provides the signal RESET to force the counter back to the zero count at the beginning or zero crossing of the subcarrier when the phase-locked loop is locked. It will also be understood that the least significant bit of the counter #2 (151), provided on line 245, toggles ten times during each subcarrier cycle. The least significant bit of the counter 240 thus comprises a CLOCK signal and negated CLOCK signal which are provided for purposes as will be described below, namely, for causing the provision of stored digital correction information from the memory of the RAM-latch-DAC 145 for the detected one of the ten color intervals.

There is also shown circuitry in FIG. 8A for providing control signals corresponding to the zero crossing of the filtered chrominance signal, as manifested by the CHROMA DETECT signal described above. The CHROMA DETECT signal provided on line 133 from the output of comparator 130 is converted into an ECL signal by a TTL-to-ECL translator 250, and then to the trigger inputs of ECL one-shots 134 and 140. One-shot 140 is preferably configured to provide a pulse of approximately 30 nS and more precisely should be adjusted to provide a pulse width almost the same as the delay provided by delay line 116 for the composite video signal, so to align the latching of the correction voltages in the RAM-latch-DAC 145 to correspond with the beginning of the signal that caused the correction to occur. The output of one-shot 140 is connected to the latch inputs of RAM-latch-DAC 145, and causes the latching of data read from RAM to the inputs of the digital-to-analog converter, on line 253. The RAM-latch-DAC will be discussed in greater detail in connection with FIG. 8B.

The rising edge of the CHROMA DETECT signal also causes a pulse to be provided by one-shot 134. In the preferred embodiment, one-shots 134, 140 are both type MC10198 ECL monostable multivibrator circuits manufactured by Motorola. The negated-Q output of one-shot 134 is connected to the input of an ECL to TTL translator 255, the output of which is designated as the CLAMP signal on line 138 provided to clamping circuits in FIG. 7B. The CLAMP signal, it may be recalled from the discussion above in connection with FIG. 2, forces the correction signals imposed upon the baseband composite video signal to zero if no control is desired. The pulse size of one-shot 134 should be selected to provide a delay about 150 nS for purposes of providing a window for chrominance correction. If no chrominance activity is encountered (no CHROMA DETECT signal occurs), correction signals are brought to a clamped "no correction" level or condition. One shot 134 keeps retriggered as long as CHROMA DETECT occurs, and if the one-shot times out, clamping occurs.

The inputs to ECL to TTL translator 255 are wire-ORed with the outputs of a TTL to ECL translator 256 so that external TTL level signals from an optional circuit (not described or shown) can force the correction to zero.

The CHROMA DETECT signal, appearing at the output of TTL-to-ECL translator 250, is also provided to the input of gate circuit 146, which is used to control counter #1 (154) in FIG. 8B. Gate circuit 146 comprises a type MC10H131 ECL flipflop 264 which is clocked at the frequency of the least significant bit of counter #2 (151), and an ECL AND gate 261. The output of translator 250 is connected to the D input of the flipflop 264, while the clock input CK is connected on line 260 to the output of AND gate 261. One input of AND gate 261 is connected on line 262 to the negated clock line or least significant bit output of counter 240. The other input to AND gate 261 is connected to the negated Q output of the flipflop 246 on line 263.

For purposes of the discussion which follows, the gate circuit 146 will hereinafter be referred to as the "aligned CHROMA DETECT flipflop". This nomenclature indicates that the flipflop will set upon receipt of the first clock signal received on line 262 after the CHROMA DETECT signal has gone true. When the aligned CHROMA DETECT flipflop sets, the negated Q output will go low, and will prevent further clock pulses from passing through gate 261 to clock the flipflop. Thus, the aligned CHROMA DETECT flipflop 146 will remain set until it is cleared by a resetting signal, unless the system is in an "external access" mode, to be described later. It will be appreciated that clock pulses corresponding to the toggling of the least significant bit of counter #2 (151) appear on line 260 until such time as the aligned CHROMA DETECT flipflop sets. The signals on line 260 are also provided to the circuitry in FIG. 8B as the LATCH COUNTER signal, which freezes the state of the counter #1 (154). The signal LATCH COUNTER is synchronized with the inverted clock signal on line 262 in order to ensure that the counters have settled.

The aligned CHROMA DETECT flipflop 146 is reset each subcarrier cycle as follows. The reset input R of the flipflop 264 is connected on line 265 to the output of an AND gate 266. One input to AND gate 266 is connected to the RESET signal on line 244 from gate 243, while the other input is connected on line 267 to the circuitry in FIG. 8B, a signal denominated ALIGNED EXTERNAL ENABLE. This signal remains low except when data is being loaded into the RAM of RAM-latch-DAC 145 during an "external access" mode. Thus, when the RESET pulse appears on line 244 upon a counter #2 (151) attaining a count of twenty (indicating the impending beginning of a new subcarrier cycle), the aligned CHROMA DETECT flipflop 146 will reset.

Turning now to the circuitry in FIG. 8B, there will now be described the function and operation of the hybrid RAM-latch-DAC 145, the loading of memory in the hybrid, and the operation of the counter #1 (154) which is latched by the aligned CHROMA DETECT flipflop 146 through AND gate 261. It will be recalled from the discussion above that counter #1 (154) is a latched counter. In the preferred embodiment, the counter portion comprises a pair of cascaded MC1654 four-bit ECL binary counters 270, 271 configured to provide an eight-bit counter. The clock input CK of the least significant counter 270 is connected to line 273 and receives a COUNT signal from the outputs of gates 274, 275, which are wire-ORed on line 273. It should thus be appreciated that a pulse provided by either of gates 274 or 275 will cause counter #1 to increment.

In normal operation, COUNT pulses are provided by gate 274. One input to gate 274 is connected on line 263 to the negated Q output of the aligned CHROMA DETECT flipflop 146 (FIG. 8A), preventing clocking to the counter after the aligned CHROMA DETECT flipflop 146 is set. The other input to gate 274 is connected on line 245 to the CLOCK signal on the least significant bit of counter #2 (151) (FIG. 8A). Thus, before the CHROMA DETECT signal occurs, line 263 is high and allows the least significant bit of counter #2 to propagate through gate 274 and provide the COUNT signal on line 273. These clock pulses are prevented from going through gate 274 when the aligned CHROMA DETECT flipflop 146 sets.

The COUNT signal on line 273 also occurs when it is desired to load the RAM-latch-DAC 145 with data provided by the central control computer. This is the "external access" mode of operation, which normally occurs during the vertical retrace interval. A COUNT signal is provided by gate 275 in the following manner. One input to gate 275 is connected on line 276 to a signal designated inverted WRITE ENABLE ($\overline{WE}$); the other input is connected on line 269 to the negated Q output of an ECL flipflop 281, which is designated as the "aligned EXTERNAL ENABLE flipflop". The clock input of flipflop 281 is connected on line 244 to the RESET signal (FIG. 8A). The D input and set input S of flipflop 281 are both tied on line 282 to the output of a TTL-to ECL translator 283. The signal appearing on line 282 is designated as an "inverted EXTERNAL ENABLE" and goes low under control of the central control computer 50 when the computer is enabling the circuitry to receive digital correction information for storage in the RAM. When the inverted EXTERNAL ENABLE signal goes low, the negated Q output on line 267 will go high only after the reset signal clocks the flipflop, enabling write enable pulses on line 276 from the computer to propagate through gate 275 to appear on line 273 as the COUNT pulses to clock counter #1. (154). Thus, the EXTERNAL ENABLE flipflop 281 is aligned with the beginning of a subcarrier cycle.

Write enable pulses appear on line 276 from the central control computer during external access as follows. The signal on line 276 is the result of a wire-ORed connection between the output of gate 280 and the output of a TTL to ECL translator 284. The signal appearing at the input of translator 284 is designated WRITE ENABLE, and is the write pulse received from the bus of the central control computer 50 (FIG. 1). In normal operation, the central control computer first makes the EXTERNAL ENABLE signal true, thereby conditioning the aligned EXTERNAL ENABLE flipflop 281 after a RESET signal (to align to the zero count of the counters) to allow the WRITE ENABLE pulse to propagate through gate 275. The WRITE ENABLE signal on line 276 is also provided to the inverted write enable inputs of the RAM-latch-DAC 145.

The output of gate 280, on line 276, is forced high during certain circumstances to prevent writing of the RAM. The RAM-latch-DAC 145 has three separate RAM banks; in the disclosed embodiment of the present invention, these three banks separately store correction data for the two delayed quadrature signals and for luminance. During the external access mode, only one of the three banks at a time is selected for loading correction data. The signals SELECT CSC1, SELECT CSC2, and SELECT CSC3 choose a particular bank when loading is desired. Only one of these SELECT signals is true at any given time during external access, but when in normal operation all SELECT lines 290, 291 are true to allow simultaneous retrieval of correction data from RAM.

Thus, the inputs to gate 280 are connected to the outputs of TTL-to-ECL translators 285, 286, which are two of the SELECT lines from the computer. The input to these translators can be provided from any two of the SELECT lines 290, and in particular the SELECT CSC2 and SELECT CSC3 signals are selected in the disclosed embodiment. During the concurrent presence of SELECT CSC2 and SELECT CSC3, the output of gate 280 will be high and prevent writing of the RAM. This forces the inverted write enable line of the RAM-latch-DAC high, preventing latching transition problems from the host computer bus which might cause counter overrun. These SELECT signals are provided from the central control computer on lines 291 to indicate that a control function is being enabled and therefore the RAM should not be written.

Returning now to counter #1 (154), it will be seen that the outputs of counters 270, 271 are connected to the inputs of latches 292-295. In the preferred embodiment, latches 292-295 comprise type MC10H131 ECL flipflops, whose clock inputs are connected on line 260 to receive the LATCH COUNTER signal provided by gate 261 (FIG. 8A). The outputs of latches 292–295 are provided on lines 296 to the address inputs of RAM-latch-DAC 145. The signal LATCH COUNTER is therefore in essence a "correction value selection signal" since it causes the selection of a particular addressable location in RAM.

It will thus be appreciated that the state of counter #1 is captured by the latches after the CHROMA DETECT signal sets the aligned CHROMA DETECT flipflop 146 and causes the LATCH COUNTER signal to occur. Thus, the address provided to the RAM-latch-DAC selects a particular predetermined addressable location in the RAM, which then is applied to the internal latches of the RAM-latch-DAC and captured by the LATCH signal on line 253 (the trailing edge of the 30 nS pulse from one-shot 140 which matches the delay of delay line 116). In the preferred embodiment, RAM-latch-DAC 145 is a hybrid triple eight-bit video digital-to-analog converter (DAC) including a 256×8 random access memory (RAM), designated a type RGC DAC 8E, manufactured by Intech Inc., of Santa Clara, Calif. This hybrid circuit provides three channels of video output at rates up to 135 MHz, and includes a latch between the RAM and DAC to hold digital data recalled from memory at the inputs of the DAC. Of course, it should be understood that the designation of this hybrid circuit as an "RGB" circuit as used in the disclosed embodiment is not entirely accurate, since there are no signals present which correspond to the red, green, or blue video channels. Rather, the circuit is employed for purposes of storing correction signal information in RAM pertaining to the two delayed quadrature chrominance signals and the luminance signal for each of the color intervals, so that the correction information pertaining to a particular color interval can be recalled and converted into an analog form so as to modify and correct the delayed baseband composite video signal.

During the external access mode, data is received from the central control computer for storage in the RAM-latch-DAC 145 in the following manner. Twisted-pair lines of the computer data bus 51 are connected to the the inputs of bus receivers 301, 302. The outputs of bus receivers 301, 302 are connected to the inputs of TTL-to-ECL translators 303, 304, which convert the data received into voltage levels suitable for providing to the RAM-latch-DAC 145. The outputs of translators 303, 304 are connected directly to the data inputs of RAM-latch-DAC 145.

Signals to select a particular one of the three RAMs in RAM-latch-DAC 145 are provided on twisted-pair lines 291 from the central control computer to the inputs of bus receiver 305. The outputs of bus receiver 305 are connected to the inputs of TTL-to-ECL translators 285, 286, and 287. The outputs of the translators 285, 286, 287 are connected to the select inputs of the RAM-latch-DAC 145. To select a particular RAM for loading data, a signal will be present on one of the SELECT lines 290, which will enable a particular one of the three 256×8 RAMs to load data from the data bus 51.

Two other signals are required to load data from the bus into the RAM. A twisted pair signal designated EXTERNAL ENABLE is received on line 310 and is provided to the input of a bus receiver 311. The output of bus receiver 311 is connected to the input of TTL-to-ECL translator 283. A twisted pair signal designated WRITE ENABLE received from the control computer is provided on line 312 to one of the available bus receivers 305. This signal is then provided to the input of TTL-to-ECL translator 284. The central control computer 50 first places a signal on lines 291 to select which of the RAMs is to receive data. The EXTERNAL ENABLE signal is also then provided which controls the aligned EXTERNAL ENABLE flipflop 281. The appropriate digital information is then placed on the data bus 51, and a WRITE ENABLE signal is provided on line 312 which strobes the selected RAM and also propagates through the now-enabled gate 275 to provide the COUNT signal on line 273 to increment counter #1 (154).

It should be understood that counter #1 begins counting from zero during the writing of the RAM by the central control computer because of the following. When the counter #2 (151) of the phase lock loop 150, which is free running, reaches a count of twenty, it will be recalled that the RESET signal is provided on line 244. The reset inputs R of the counters 270, 271 comprising counter #1 (154) are connected to line 265 and reset the counters once each subcarrier cycle when the ALIGNED RESET signal is provided by gate 266. This will have the effect of resetting counter #1 (154) once per subcarrier cycle at all times when the EXTERNAL ENABLE signal from the central control computer is not present (during normal operation). When the negated EXTERNAL ENABLE signal goes low, the aligned EXTERNAL ENABLE flipflop 281 is allowed to clear, when the next RESET pulse clocks in the low present on line 282. The Q output of flipflop 281 thus goes low, preventing the RESET pulse from propagating through the gate 266 to line 265 because line 267 will go low. Thus, counter #1 (154) will be at the zero state at the beginning of each subcarrier cycle, since the RESET signal on line 244 clocks flipflop 281 only at the beginning of a subcarrier cycle.

It should by now be understood that during normal operation, counter #1 (154) is reset at the beginning of each subcarrier cycle and is frozen at the count present when the aligned CHROMA DETECT flipflop 46 is set, indicating the presence of the CHROMA DETECT signal. This, it will be recalled, indicates the phase difference between the 3.58 MHz reference subcarrier signal and the CHROMINANCE signal. Accordingly, it will be understood that the count of counter #1 corresponds to the color interval associated with such phase difference. It will be further understood that the count of counter #1 selects a predetermined address in the RAM of RAM-latch-DAC 145, and that the contents of this selected address is a digital correction value which is to be applied to the composite video signal to correct the hue, saturation, and luminance. It will by now be understood that the outputs of the DACs of RAM-latch-DAC 145 are analog voltage levels which are provided as the correction or control signals which have been designated as CSC1, CSC2, and CSC3 on lines 142 as the CHROMA CONTROL signals.

ANALOG CIRCUITRY DETAIL-CHROMA CORRECTION

Turning now to FIG. 7B, there will now be explained the circuitry responsive to the analog correction signals CSC1, CSC2, and CSC3, provided on lines 142 as the CHROMA CONTROL signals. These CHROMA CONTROL signals are provided to the inputs of buffer amplifiers 320, 321, and 322, respectively. In the preferred embodiment, these buffer amplifiers are type TL592 differential video amplifiers which are configured in a single-ended mode with one input being connected to the respective chroma control signal and the other differential input being connected to a conventional trim circuit (not shown) to align and adjust the offsets of the amplifiers as well as the midpoint of the DAC output range. The outputs of buffer amplifiers 320–322 are all provided in the differential mode.

The chroma control signal CSC2 is used to control the correction of the 135° phase shifted delayed quadrature chrominance signal provided on line 174 from FIG. 7A. This 135° phase shifted signal is provided through coupling capacitors C11, C12 to the differential inputs of the X term of a multiplier circuit 183. The Y term input of multiplier circuit 183 is received on lines 324 from the output of buffer amplifier 320. In the preferred embodiment, the multiplier circuit employed is a type MC 1595L wideband monolithic four-quadrant analog multiplier manufactured by Motorola, Inc., Phoenix, Ariz. It will be understood by those skilled in the art that multiplier circuit 183 multiplies the signal received on its two differential input terms.

A clamping circuit 135 is provided for insuring "no correction" for the output signal in response to receipt of a CLAMP signal on line 138. The preferred embodiment of the clamping circuit 135 comprises a pair of NPN transistors having their bases tied commonly to line 138. The emitters of the transistors are tied to ground (zero volts), while the collectors are connected to resistor divider network R20 for balancing. Those skilled in the art will understand that a high voltage level on line 138 will drive the collectors of the clamping transistors to ground and will thereby provide no differential voltage between the differential inputs of the Y term of the multiplier 183. Accordingly, it will be appreciated that the effect of providing a zero differential at the Y term input causes the signal present at the input (the 135° phase shifted chrominance signal input) to be multiplied by zero, thereby preventing the 135° phase shifted signal from passing through the multiplier.

The differential output of multiplier 183 is provided on lines 186 through coupling capacitors C13, C14 to the input of a buffer amplifier 330. The type TL592 differential video amplifier is again the preferred buffer amplifier.

In a manner similar to that described in connection with multiplier 183, the chroma control signal CSC1 is buffered by buffer amplifier 321, and provided on lines 340 to the differential inputs of the Y term of separate multiplier circuit 180. The differential inputs of the X term of multiplier 180 receive the net 45° phase shifted delayed quadrature chrominance signal on lines 173 through coupling capacitors C15, C16. A clamping circuit 136 similar to clamping circuit 135 drives Y term inputs of multiplier 180 to zero during the presence of the CLAMP signal on line 138. The output of multiplier circuit 180 is provided on lines 185 to the input of a buffer amplifier 350, again a type TL592 differential video amplifier. It will thus be appreciated that the chroma control signal CSC1 is used to alter the net 45° phase shifted chrominance signal using multiplier 180, so as to provide correction or control for this quadrature component of the overall chrominance signal.

It will be recalled from the discussion of FIG. 9 above that two particular video parameters corrected or controlled in the disclosed embodiment include the hue of the video image and the saturation of the hue. Any other video parameter over which control is desired as a function of instantaneous hue can also be controlled, for example, gain, gamma, and black level, by employing the techniques disclosed herein. In order to provide for control over the hue and saturation, the delayed baseband composite video signal is additively combined with the two delayed quadrature chrominance signals so as to obtain a resultant baseband composite video signal which is altered in phase (and is thereby altered in hue) and/or is altered in amplitude (and is thereby altered in saturation). Those skilled in the art will understand that the digital correction values stored in the RAM-latch-DAC 145 correspond to values which when converted into analog form and provided on the respective two delayed quadrature chrominance signal channels, modify these delayed quadrature chrominance signals in an amount so that when the delayed quadrature chrominance signals are additively combined with the delayed baseband composite signal, will produce the resultant composite video signal altered in phase and/or amplitude by a predetermined amount selected by the operator of the system.

Accordingly, after the control signals CSC1 and CSC2 have been imposed upon their respective phase shifted quadrature components of the delayed quadrature chrominance signal, the signals are combined with the delayed composite video signal at mixer 121 to form a corrected composite video signal.

Additionally, luminance correction is provided for the composite video signal by adjusting its instantaneous DC level. Control signal CSC3 is provided to the input of a buffer amplifier 322, the outputs of which are provided on lines 192 to a summing junction 121. Summing junction 121 in FIG. 7B corresponds to mixer 121 in FIG. 2.

The output of buffer amplifier 330 (the modified 135° phase shifted delayed quadrature chrominance signal), the output of buffer amplifier 320 (the modified 45° phase shifted delayed quadrature chrominance signal), and the output of a buffer amplifier 120 (the delayed uncorrected baseband composite video signal) are all connected through coupling capacitors C17–C22 and load resistors to the summing junction 121 to additively combine all these signals. After all of the corrected 45° and 135° phase shifted delayed quadrature chrominance signals, the delayed composite video signal, and the corrected luminance signal are recombined at the summing junction 121, the resultant differential signal is connected to the differential inputs of video buffer amplifier 191. In the preferred embodiment, the video buffer amplifier is a type HA-5160 wideband uncompensated operational amplifier manufactured by Harris Corporation, Melbourne, Fla. The output of amplifier 191 is the single-ended corrected composite video signal provided on line 25.

The preferred embodiment of the present invention has been disclosed by way of example and it will be understood that other modifications may occur to those skilled in the art without departing from the scope and the spirit of the appended claims.

We claim:

1. A phase responsive video signal correction system for correcting a video parameter of an image represented by a composite video signal, comprising:
   phase detecting means responsive to detect relative phase between a phase encoded component of an uncorrected composite video signal and a reference signal in each one of a plurality of ranges of phases representable by said composite video signal;

correction signal means responsive to said detected relative phase for generating a correction signal related to said detected relative phase; and means responsive to said correction signal for correcting said uncorrected composite video signal to provide a corrected composite video signal.

2. The system of claim 1, wherein said correcting means selectively corrects a chrominance portion of said uncorrected composite video signal.

3. The system of claim 2, wherein said correcting means selectively corrects the hue of a particular hue represented by said uncorrected composite video signal.

4. The system of claim 2, wherein said correcting means selectively corrects the saturation of a particular hue represented by said uncorrected composite video signal.

5. The system of claim 1, wherein said correcting means selectively corrects a luminance portion of said uncorrected composite video signal.

6. The system of claim 5, wherein said correcting means selectively corrects a luminance portion of a particular hue represented by said uncorrect composite video signal.

7. The system of claim 1, wherein said correction signal means is programmably variable.

8. A phase responsive video parameter control system for controlling a video parameter of a portion of a video image represented by a phase-encoded input video signal, said portion of said video image being at least partially defined by a predetermined hue, comprising:

memory means for storing a plurality of correction signals, each of said correction signals corresponding to a desired value of said video parameter for each one of a plurality of color intervals, each of said color intervals corresponding to one of a plurality of ranges of phase differences between said input video signal and a subcarrier reference signal;

phase detecting means responsive to said phase-encoded video signal for detecting said predetermined hue by detecting relative phase between said phase encoded video signal and said subcarrier reference signal and for providing a correction value selection signal related to the detected instantaneous hue of said video image;

correction value selecting means responsive to said correction value selection signal for selecting and retrieving a particular one of said plurality of correction signals associated with a particular one of said color intervals stored in said memory means and for providing said particular correction signal as an output, said particular correction signal being related to a particular desired value of said video parameter for said detected instantaneous hue; and means responsive to said particular correction signal for controlling said video parameter to said particular desired value.

9. The system of claim 8, further comprising means for dividing each cycle of said subcarrier reference signal into said plurality of color intervals, and wherein said correction value selecting means selects and retrieves a particular one of said correction signals associated with a particular one of said color intervals.

10. The system of claim 9, wherein said dividing means comprises:

phase locked loop means for locking to the frequency of said subcarrier reference signal, said phase locked loop including a voltage controlled oscillator having an output signal having a frequency at least about N times the frequency of said subcarrier reference signal, N being the number of discrete color intervals; and digital counter means responsive to said output signal of said oscillator to count to N once each cycle of said subcarrier reference signal.

11. The system of claim 9, wherein said memory means is responsive to said dividing means to repetitively provide said plurality of said correction signals in a predetermined sequence corresponding to said color intervals, and wherein said correction value selecting means comprises latching means responsive to said correction value selection signal to temporarily store a particular one of said correction signals being provided by said memory means at a time of occurrence of said correction value selection signal.

12. The system of claim 8, further comprising operator control means for providing updated correction signals in response to actuation by an operator to indicate a desired change in control, and means for periodically storing said updated correction signals in said memory means during an external access mode.

13. The system of claim 12, wherein said storing means is operative during a video signal vertical retrace interval.

14. The system of claim 8, wherein said video parameter is the hue of said detected instantaneous hue.

15. The system of claim 8, wherein said video parameter is the saturation of said detected instantaneous hue.

16. The system of claim 8, wherein said video parameter is the luminance of said detected instantaneous hue.

17. The system of claim 8, wherein said phase detecting means and said correction value selecting means are responsive to select said particular correction signal at least once each cycle of said subcarrier reference signal.

18. The system of claim 8, wherein each of said correction signals corresponds to a desired value of said video parameter for a plurality of predetermined ranges of hues, each of said predetermined ranges of hues comprising a plurality of particular instantaneous hues.

19. The system of claim 18, further comprising means for dividing each cycle of said subcarrier reference signal into a plurality of discrete color intervals, each of said color intervals corresponding to one of said predetermined ranges of hue, and wherein each of said color intervals is associated with a particular one of said correction signals stored in said memory means.

20. A hue responsive video parameter control system for controlling a video parameter of a portion of a video image, said portion of said video image being at least partially defined by a predetermined hue, comprising:

operator hue selection means for selecting a particular predetermined hue of said video image in response to actuation by an operator;

hue detecting means responsive to an input video signal to detect said selected particular predetermined hue and to provide a hue detect signal;

memory means for storing a plurality of correction signals, each one of said plurality of correction signals corresponding to a different one of a plurality of predetermined hues;

means responsive to said hue detect signal for retrieving a correction signal related to a desired value of a video parameter for said selected particular predetermined hue from said memory means; and means for applying said retrieved correction signal to said input video signal to correct said video parameter to said desired value.

21. The system of claim 20, further comprising operator correction signal control means for selectively varying said correction signal.

22. The system of claim 20, further comprising memory means for storing a plurality of correction signals, each one of said plurality of correction signals corresponding to a different one of a plurality of predetermined hues.

23. The system of claim 22, further comprising second memory means for storing a plurality of sets of said correction signals, each one of said sets corresponding to a particular plurality of said correction signals associated with a particular video image.

24. The system of claim 20, further comprising memory means for storing a plurality of sets of correction signals, each of said sets being associated with a different video image, each of said sets comprising a plurality of correction signals, and wherein said memory means is responsive to provide a particular one of said sets of correction signals in response to receipt of a scene change signal indicative of a change in video images.

25. The system of claim 24, wherein said scene change signal is provided by an operator.

26. The system of claim 24, wherein said scene change signal is provided automatically by a control unit during provision of a series of video images.

27. A hue responsive video signal correction system for correcting a video parameter of an image represented by an uncorrected input color video signal, comprising:

hue detecting means responsive to said input color video signal for detecting hue of said input color video signal in one of a plurality of ranges of hues representable by said input color video signal; and means responsive to said hue detecting means and comprising a single channel circuit for correcting a parameter of said uncorrected input color video signal to provide a corrected color video output signal.

28. The system of claim 27, wherein said video parameter is the hue of said portion of said video image.

29. The system of claim 27, wherein said video parameter is the saturation of said portion of said video image.

30. The system of claim 27, wherein said video parameter is the luminance of said portion of said video image.

31. The system of claim 27, further comprising memory means for storing a plurality of correction signals, each of said plurality of correction signals being related to a different predetermined hue, and wherein said correcting means selects a particular one of said plurality of correction signals stored in said memory means related to a particular predetermined hue.

32. The system of claim 31, wherein said memory means is an addressable digital memory, wherein said correction signals are digital signals, and wherein said hue detecting means selects a particular address of said addressable memory to select said particular one of said correction signals.

33. The system of claim 27, wherein said video parameter is the hue of said portion of said video image, and further comprising:

quadrature signal means for converting said input color video signal into a pair of quadrature-related chrominance component signals;

quadrature signal correction means for modifying the amplitude of one of said chrominance component signals to provide a modified chrominance component signal; and quadrature component signal mixing means for mixing said modified chrominance component signal with the other one of said chrominance component signals to provide said corrected color video output signal.

34. The system of claim 33, wherein said quadrature signal correction means comprises analog multiplier means.

35. The system of claim 33, wherein said quadrature signal means comprises phase shifting means responsive to shift said phase-encoded video signal by ninety degrees to provide one of said pair of quadrature-related chrominance component signals.

36. The system of claim 27, wherein said input color video signal is a composite video signal including a luminance signal and a chrominance signal, and further comprising filter means for separating said chrominance signal from said composite video signal and for providing said chrominance signal to said hue detecting means.

37. The system of claim 27, wherein said hue detecting means comprises:

means responsive to said input color video signal for providing a chroma detect signal once each cycle of said input color video signal, said chroma detect signal having an edge aligned with the coincidence of said input color video signal with a predetermined reference voltage level;

first digital counter means responsive to count to a predetermined count once each cycle of said reference signal, said first counter means being reset to a predetermined nominal count once each cycle of said reference signal; and means responsive to said chroma detect signal for holding a digital count of said first counter means at a time of occurrence of said edge of said chroma detect signal, said digital count representing a value related to the instantaneous hue of said image.

38. The system of claim 37, wherein said hue detecting means further comprises phase locked loop means for locking to the frequency of said reference signal.

39. The system of claim 38, wherein said phase locked loop includes an oscillator having an output frequency greater than the frequency of said reference signal, and further comprising second digital counter means responsive to an output signal of said oscillator to count to a predetermined count once each cycle of said reference signal, said first digital counter means being responsive to count upon each occurrence of a first particular output signal from said second digital counter means and to reset upon each occurrence of a second particular output signal from said second digital counter means, whereby said first digital counter divides each cycle of said reference signal into said plurality of ranges of hues.

40. The system of claim 39, wherein said digital count held by said holding means selects a particular one of said plurality of ranges, whereby a particular one of a plurality of desired values of said video parameter is selected.

41. The system of claim 46, further comprising memory means for storing said plurality of desired values of said video parameter.

42. The system of claim 41, wherein said memory means is an addressable memory, and wherein said correcting means selects a particular address of said addressable memory to obtain said particular one of said plurality of desired values.

43. A phase responsive video signal correction system for correcting a video parameter of an image represented by a color video signal, comprising:
   phase detecting means responsive to detect relative phase between a phase encoded component of an uncorrected color video signal and a reference signal;
   correction signal means for generating a plurality of correction signals, each of said correction signals being related to a different one of a plurality of ranges of relative phase between said uncorrected color video signal and said reference signal;
   correction signal selecting means responsive to said detected relative phase detected by said detecting means for selecting a particular one of said correction signals corresponding to one of said ranges of relative phase; and
   means responsive to said selected correction signal for correcting said uncorrected color video signal to provide a corrected output color video signal.

44. A video signal color correction system for correcting a video parameter of an image represented by an input color video signal, comprising:
   means for defining a plurality of color control ranges, each of said color control ranges comprising those hues of the visible color spectrum which fall within a region of the spectrum defined by a first boundary of a predetermined first hue and a second boundary of a predetermined second hue;
   detecting means for detecting when said input color video signals have hues within one of said color control ranges and responsive to provide a hue detect signal;
   operator control means for providing color control signals indicative of an adjustment of a selected video parameter related to hues within said color control ranges; and
   means responsive to said hue detect signal for applying said color control signals to said input color video signal.

45. A video signal color correction system for correcting a video parameter of an image represented by a color video signal, comprising:
   memory means for storing a plurality of correction signals, each of said correction signals corresponding to a color correction for a video parameter having a hue within a predetermined color interval;
   means responsive to said input color video signal for selecting one of said correction signals stored in said memory means as a function of the instantaneous hue of the video image; and
   correction means responsive to said selected one of said correction signals for correcting said input color video signal to provide a color corrected video output signal.

46. A video signal color correction system for correcting a video parameter of an image represented by an input color video signal, comprising:
   means for providing a plurality of color correction regions on a vectorscope representation of said color video signal;
   memory means for storing a selectively variable correction signal corresponding to corrections for a video parameter;
   means for detecting when said color video signal is within one of said color correction regions;
   means for retrieving said correction signal from said memory means in response to said detecting means; and
   correction means responsive to said retrieved correction signal for correcting said input color video signal to provide a corrected video output signal.

47. A phase responsive luminance control system for controlling the luminance of a portion of a video image represented by a phase-encoded video signal, said portion of said video image being at least partially defined by a predetermined hue, comprising:
   phase detecting means responsive to detect said predetermined hue by detecting relative phase between said phase-encoded video signal and a reference signal in each one of a plurality of ranges of phases representable by said phase-encoded video signal;
   luminance controlling means responsive responsive to said detected relative phase for generating a correction signal related to said detected relative phase; and
   means responsive to said correction signal for controlling luminance in a video signal corresponding to said phase encoded video signal.

48. The system of claim 47, wherein said phase encoded video signal is a composite video signal including a luminance signal portion and a chrominance signal portion, and wherein said luminance controlling means is operative to control said luminance signal portion.

49. The system of claim 47, wherein said luminance controlling means is programmably variable.

50. A phase responsive chrominance control system for controlling the chrominance of a portion of a video image represented by a chrominance signal, said portion of said video image being at least partially defined by a predetermined hue, comprising:
   phase detecting means responsive to detect said predetermined hue by detecting relative phase between said chrominance signal and a reference signal in each one of a plurality of ranges of phases representable by said chrominance signal;
   correction signal means responsive to said detected relative phase for generating a correction signal related to said detected relative phase; and
   means responsive to said correction signal for controlling said chrominance signal to provide a corrected chrominance signal.

51. The system of claim 50, wherein said controlling means comprises phase-shifting means for shifting the phase of said chrominance signal, whereby the hue of said portion of said video image is controlled.

52. The system of claim 51, wherein said phase-shifting means comprises quadrature signal means for converting said chrominance signal into a pair of quadrature-related chrominance component signals, and further comprising:

quadrature signal correction means responsive to said correction signal for modifying the amplitude of one of said chrominance component signals to provide a modified chrominance component signal; and quadrature component signal mixing means for mixing said modified chrominance component signal with the other one of said chrominance component signals to provide said corrected chrominance signal.

53. The system of claim 50, wherein said controlling means comprises amplitude adjusting means for adjusting the amplitude of said chrominance signal, whereby the saturation of said portion of said video image is controlled.

54. The system of claim 50, wherein said correction signal means is programmably viable.

55. A phase responsive video signal correction system for correcting a video parameter of an image represented by a composite video signal, comprising:

phase detecting means responsive to detect relative phase between a phase encoded component of an uncorrected composite video signal and a reference signal;

correction signal means responsive to said detected relative phase for generating a correction signal related to said detected relative phase; and means responsive to said correction signal for selectively correcting a luminance portion of a particular hue represented by said uncorrected composite video signal to provide a corrected composite video signal.

56. A phase responsive video parameter control system for controlling a video parameter of a portion of a video image represented by a phase-encoded video signal, said portion of said video image being at least partially defined by a predetermined hue, comprising:

memory means for storing a plurality of correction signals, each of said correction signals corresponding to a desired value of said video parameter for a particular instantaneous hue;

phase detecting means responsive to said phase-encoded video signal for detecting said predetermined hue by detecting relative phase between said phase encoded video signal and a subcarrier reference signal and for providing a correction value selection signal related to a detected instantaneous hue of said video image;

means for dividing each cycle of said subcarrier reference signal into a plurality of discrete color intervals, each of said color intervals being related to a particular one of said correction signals stored in said memory means;

correction value selecting means responsive to said correction value selection signal for selecting and retrieving a particular one of said plurality of correction signals associated with a particular one of said color intervals stored in said memory means and for providing said particular correction signal as an output, said particular correction signal being related to a particular desired value of said video parameter for said detected instantaneous hue; and means responsive to said particular correction signal for controlling said video parameter to said particular desired value.

57. A phase responsive video parameter control system for controlling a video parameter of a portion of a video image represented by a phase-encoded video signal, said portion of said video image being at least partially defined by a predetermined hue, comprising:

memory means for storing a plurality of correction signals, each of said correction signals corresponding to a desired value of said video parameter for a particular instantaneous hue;

phase detecting means responsive to said phase-encoded video signal for detecting said predetermined hue by detecting relative phase between said phase encoded video signal and a subcarrier reference signal and for providing a correction value selection signal related to a detected instantaneous hue of said video image;

correction value selecting means responsive to said correction value selection signal for selecting and retrieving a particular one of said plurality of correction signals stored in said memory means and for providing said particular correction signal as an output, said particular correction signal being related to a particular desired value of said video parameter for said detected instantaneous hue;

means responsive to said particular correction signal for controlling said video parameter to said particular desired value;

operator control means for providing updated correction signals in response to actuation by an operator to indicate a desired change in control; and means for periodically storing said updated correction signals in said memory means during an external access mode.

58. A phase responsive video parameter control system for controlling a video parameter of a portion of a video image, said portion of said video image being at least partially defined by a predetermined hue, comprising:

means for developing a phase-encoded video signal representative of a video image to be controlled;

operator hue selection means for selecting a particular predetermined hue of said video image in response to actuation by an operator;

phase detecting means responsive to said phase-encoded video signal to detect said selected particular predetermined hue by detecting relative phase between said phase-encoded video signal and a subcarrier reference signal;

means responsive to said detected relative phase for generating a correction signal related to a desired value of a video parameter for said selected particular predetermined hue;

memory means for storing a plurality of correction signals, each one of said plurality of correction signals corresponding to a different one of a plurality of predetermined hues;

second memory means for storing a plurality of sets of said correction signals, each one of said sets corresponding to a particular plurality of said correction signals associated with a particular video image; and means responsive to said correction signal for correcting said video parameter to said desired value.

59. A phase responsive video parameter control system for controlling a video parameter of a portion of a video image, said portion of said video image being at least partially defined by a predetermined hue, comprising:

means for developing a phase-encoded video signal representative of a video image to be controlled;

operator hue selection means for selecting a particular predetermined hue of said video image in response to actuation by an operator;

phase detecting means responsive to said phase-encoded video signal to detect said selected particular predetermined hue by detecting relative phase between said phase-encoded video signal and a subcarrier reference signal;

memory means for storing a plurality of sets of a plurality of correction signals, each one of said sets being associated with a different video image, said memory means being responsive to provide a particular one of said sets of correction signals in response to receipt of a scene change signal indicative of a change in video images;

means responsive to said detected relative phase for retrieving from said memory means one of said correction signals related to a desired value of a video parameter for said selected particular predetermined hue; and means responsive to said correction signal for correcting said video parameter to said desired value.

* * * * *